(12) United States Patent
Oh et al.

(10) Patent No.: US 10,697,354 B2
(45) Date of Patent: Jun. 30, 2020

(54) HEAT EXCHANGER

(71) Applicant: Hanon Systems, Daejeon (KR)

(72) Inventors: Kwang Hun Oh, Daejeon (KR); Seok Jong Yoo, Daejeon (KR); Sang Min Lee, Daejeon (KR); Ara Jo, Daejeon (KR)

(73) Assignee: Hanon Systems, Daejeon (KR)

(*) Notice: Subject to any disclaimer, the term of this patent is extended or adjusted under 35 U.S.C. 154(b) by 274 days.

(21) Appl. No.: 15/683,251

(22) Filed: Aug. 22, 2017

(65) Prior Publication Data

US 2018/0058306 A1    Mar. 1, 2018

(30) Foreign Application Priority Data

Aug. 25, 2016  (KR) .................. 10-2016-0108216
Aug. 25, 2016  (KR) .................. 10-2016-0108499
Sep. 30, 2016  (KR) .................. 10-2016-0126367

(51) Int. Cl.
  *F02B 29/04*    (2006.01)
  *F28D 9/00*     (2006.01)
  (Continued)

(52) U.S. Cl.
  CPC ........ *F02B 29/0462* (2013.01); *F28D 9/0056* (2013.01); *F28F 3/02* (2013.01); *F28F 9/001* (2013.01); *F28F 9/0075* (2013.01); *F28F 9/0246* (2013.01); *F28D 2021/0082* (2013.01); *F28F 3/025* (2013.01); *F28F 3/042* (2013.01);
  (Continued)

(58) Field of Classification Search
  CPC ......... F02B 29/0462; F28D 2021/0082; F28D 9/0056; F28F 2009/0285; F28F 2225/00; F28F 2225/04; F28F 2250/06; F28F 3/02; F28F 3/025; F28F 3/042; F28F 3/06; F28F 9/001; F28F 9/0075; F28F 9/0246; Y02T 10/146
  See application file for complete search history.

(56) References Cited

U.S. PATENT DOCUMENTS 5,209,290 A * 5/1993 Chigira .................. F28F 9/002
                                                          165/149
5,893,408 A * 4/1999 Stark ........................ F24F 3/14
                                                          165/100

(Continued)

FOREIGN PATENT DOCUMENTS

KR       10-1116844 B1    2/2012

*Primary Examiner* — Jesse S Bogue
(74) *Attorney, Agent, or Firm* — Norton Rose Fulbright US LLP; James R. Crawford

(57) ABSTRACT

Provided is a heat exchanger including a core portion configured to include an inlet header tank and an outlet header tank having a space, in which cooling water is stored and flows, formed therein and formed in a height direction, a plurality of tubes having both ends connected to the header tanks to form a cooling water channel, and fins interposed between the tubes, in which a core portion of the heater exchanger is formed to block only a part of a bypass area of a part where inlet/outlet header tanks are positioned to reduce a pressure loss of air which is a cooled fluid while minimizing a reduction in heat radiation performance of the heat exchanger and structural rigidity of the core portion is increased by a reinforcing structure formed at an outer side of the core portion to improve durability.

6 Claims, 35 Drawing Sheets

(51) Int. Cl.
    *F28F 9/007*    (2006.01)
    *F28F 3/02*     (2006.01)
    *F28F 9/00*     (2006.01)
    *F28F 9/02*     (2006.01)
    *F28F 3/04*     (2006.01)
    *F28F 3/06*     (2006.01)
    *F28D 21/00*    (2006.01)

(52) U.S. Cl.
    CPC .......... *F28F 3/06* (2013.01); *F28F 2009/0285* (2013.01); *F28F 2225/00* (2013.01); *F28F 2225/04* (2013.01); *F28F 2250/06* (2013.01); *Y02T 10/146* (2013.01)

(56) References Cited

U.S. PATENT DOCUMENTS

| | | | | |
|---|---|---|---|---|
| 5,901,573 A * | 5/1999 | Kobayashi | ........... | B60H 1/3229 62/507 |
| 6,513,579 B1 * | 2/2003 | Kent | ........... | F28F 9/002 165/67 |
| 6,889,521 B2 * | 5/2005 | Seno | ........... | F25B 39/04 62/506 |
| 8,316,925 B2 * | 11/2012 | Pimentel | ........... | F02B 29/0462 165/152 |
| 9,175,596 B2 * | 11/2015 | Eilemann | ........... | F02B 29/0462 |
| 9,671,178 B2 * | 6/2017 | Zager | ........... | F28F 3/08 |
| 9,709,342 B2 * | 7/2017 | Dornseif | ........... | F28F 9/02 |
| 9,766,023 B2 * | 9/2017 | Schatz-Knecht | ........... | F28F 9/001 |
| 9,903,661 B2 * | 2/2018 | Odillard | ........... | F28F 13/06 |
| 2006/0278377 A1 * | 12/2006 | Martins | ........... | F02B 29/0412 165/140 |
| 2007/0175617 A1 * | 8/2007 | Brost | ........... | F28D 9/0043 165/149 |
| 2012/0247145 A1 * | 10/2012 | Denoual | ........... | F28D 9/0006 62/498 |
| 2014/0231054 A1 * | 8/2014 | Martins | ........... | F28F 3/08 165/166 |
| 2014/0374073 A1 * | 12/2014 | Schatz-Knecht | ........... | F28F 9/001 165/151 |
| 2017/0108283 A1 * | 4/2017 | Devedeux | ........... | F02B 29/0462 |

* cited by examiner

HEAT EXCHANGER

CROSS-REFERENCE TO RELATED APPLICATIONS

This application claims priority under 35 U.S.C. § 119 to Korean Patent Application No. 10-2016-0108216, filed on Aug. 25, 2016, No. 10-2016-0108499, filed on Aug. 25, 2016 and No. 10-2016-0126367, filed on Sep. 30, 2016, in the Korean Intellectual Property Office, the disclosure of which is incorporated herein by reference in its entirety.

TECHNICAL FIELD

The following disclosure relates to a heat exchanger, and more particularly, to a heat exchanger capable of cooling air compressed to a high temperature and a high pressure by a supercharger in a water-cooled type to increase an output of an engine, in the heat exchanger.

BACKGROUND

In a heat exchanger, an intercooler is an apparatus for cooling compressed air at a high temperature and a high pressure by a supercharger to increase an output of an engine.

The air rapidly compressed by the supercharger becomes extremely high in temperature and thus a volume of the compressed air is expanded and an oxygen density reduces, resulting in a reduction in charging efficiency in the cylinder. Therefore, the intercooler cools the high-temperature air compressed by the supercharger to increase suction efficiency of the engine cylinder and increase combustion efficiency, thereby increasing fuel efficiency.

The intercooler in charge of the role may be divided into water-cooled type and air-cooled type according to a cooling method. Among those, a principle of a water-cooled intercooler 10 is similar to that of an air-cooled intercooler, but the water-cooled intercooler 10 differs from the air-cooled intercooler in that it cools the compressed air using cooling water of a vehicle, water or the like instead of using external air when cooling the intercooler through which the high-temperature air passes.

The water-cooled intercooler 10 illustrated in FIG. 1 includes a first header tank 20 and a second header tank 30 disposed in parallel while being spaced apart from each other by a predetermined distance; a first inlet pipe 40 formed in the first header tank 20 and having air introduced therethrough and a first outlet pipe 50 formed in a second header tank 30 and having the air discharged therethrough; a plurality of tubes 60 having both ends fixed to the first header tank 20 and the second header tank 30 to form air passages; fins 70 interposed between the tubes 60; a cover member 80 having an assembly of the tubes 60 and the fins 70 housed therein and opened on one side surface and the other side surface where one end part of the tube 60 is located; and a second inlet pipe 41 formed on one side surface of the cover member 80 and having cooling water introduced therethrough and a second outlet pipe 51 formed on one side of the cover member 80 and having the cooling water discharged therethrough.

On the contrary, the water-cooled intercooler 10 may be configured to pass cooling water through an inside of a tube and include a case having a heat exchanger core disposed therein and surrounding the core, with the heat exchanger core being an assembly in which a header tank, a tube, and a fin are assembled, and be cooled by the core while air passing through the inside of the case.

However, in order to increase the heat exchange efficiency, the water-cooled intercooler is surrounded with the case so that air does not bypass the core. Since there are inlet/outlet header tanks which are spaces in which the cooling water stored in the core disposed in the case is distributed into the tubes and flows, the heat exchange performance may deteriorate. Also, when air does not pass through a part where the header tanks of the core are disposed, a pressure drop amount of air increases and thus a pressure loss may increase.

In addition, on the contrary, the water-cooled intercooler 10 may be configured to pass cooling water through an inside of a tube and include a housing having a heat exchanger core disposed therein and surrounding the core, with the heat exchanger core being an assembly in which a header tank, a tube, and a fin are assembled, and cool air by the core while air passing through the inside of the housing. The water-cooled intercooler may include a top plate joined to an upper surface of the heat exchanger core for strength reinforcement, in which the top plate is formed in a flange shape and may be joined to an opening portion of the housing, in which the heat exchanger core is housed, by a fastening means or the like.

However, since as the high-temperature air compressed by the supercharger passes through the inside of the housing, the top plate joined to the heat exchanger core is deformed by the pressure of the air and thus a clearance is formed between the contact surfaces of the housing and the top plate, such that air may be leaked to the outside of the housing.

In addition, the conventional heat exchanger has a low mechanical strength, and therefore to reinforce the mechanical strength, the conventional heat exchanger may be configured to increase structural rigidity by joining a plate for strength reinforcement to an upper side surface on which the tank portion 10 is formed and a lower side surface opposite thereto.

However, if the plates for strength reinforcement are separately formed on the heat exchanger and joined to each other for the strength reinforcement, the number of components to be assembled and joined increases, such that assembling performance and productivity may be reduced.

RELATED ART DOCUMENT

Patent Document

KR 10-1116844 B1 (Feb. 8, 2012)

SUMMARY

An embodiment of the present invention is directed to providing a heat exchanger capable of minimizing a reduction in cooling performance by partially opening portion of a bypass area of a part, where inlet/outlet header tanks are located, in a heat exchanger core portion and reducing a pressure loss of air as a fluid cooled by passing through the core portion.

In one general aspect, a heat exchanger includes: a core portion 100 configured to include an inlet header tank 110 and an outlet header tank 120 having a space, in which cooling water is stored and flows, formed therein and formed in a height direction, a plurality of tubes 130 having both ends connected to the header tanks 110 and 120 to form a cooling water channel, and fins 140 interposed between the tubes 130; a side reinforcing plate 200 configured to be disposed on a side surface of the core portion 100 in a longitudinal direction and joined to the tubes 130 of the core portion 100; and a blocking plate 300 configured to extend from the side reinforcing plate 200 in a longitudinal direction to block an air inflow side of the core portion 100 corresponding to a bypass area B where the header tanks 110 and 120 are formed, in which the blocking plate 300 may be formed to block only a part in a longitudinal direction of an area where the header tanks 110 and 120 are formed.

The heat exchanger may further include the blocking plate 300 configured to extend in a longitudinal direction from the side reinforcing plate 200 to block an air discharge side of the core portion 100 corresponding to the bypass areas B where the header tanks 110 and 120 are formed and block only the part in the longitudinal direction of the area where the header tanks 110 and 120 are formed.

The inlet header tank 110 and the outlet header tank 120 may be disposed on one side of the core portion 100 in the longitudinal direction.

The inlet header tank 110 and the outlet header tank 120 may be disposed at the same position in the longitudinal direction.

A blocking area ratio formed so that the blocking plate 300 blocks the bypass area B may range from 50% to 95%.

The blocking plate 300 may be joined to the core portion 100.

The blocking plate 300 may have an opening portion 310 formed at an end part thereof in the longitudinal direction.

The opening portion 310 may be formed between the tubes 130 of the core portion 100 in a height direction.

The blocking plate 300 may have a through hole 330 formed at an end part thereof in the longitudinal direction.

In another general aspect, a heat exchanger includes: a core portion 100 configured to include an inlet header tank 110 and an outlet header tank 120 having a space, in which cooling water is stored and flows, formed therein and formed in a height direction, a plurality of tubes 130 having both ends connected to the header tanks 110 and 120 to form a cooling water channel, and fins 140 interposed between the tubes 130; a first upper reinforcing plate 500 configured to be joined to an upper part of the core portion 100 and formed in a plate shape; and a second upper reinforcing plate 600 configured to be provided with a rib 610 protruding upwardly and a space portion 620 depressed at an opposite side to the side where the rib 610 protrudes, and thus coupled to the upper side of the first upper reinforcing plate 500 and have a lower surface joined to an upper surface of the first upper reinforcing plate 500.

A circumference of the first upper reinforcing plate 500 and a circumference of the second upper reinforcing plate 600 may be formed to coincide with each other, and a ratio of an area where the first upper reinforcing plate 500 and the second upper reinforcing plate 600 are joined to each other may range from 50% to 80%.

The second upper reinforcing plate 600 may be provided with the rib 610 and the space 620 integrally formed by pressing one board.

The first upper reinforcing plate 500 and the second upper reinforcing plate 600 may be formed to be wider in a width direction and a longitudinal direction than an upper surface of the core portion 100, and circumferential parts of the first upper reinforcing plate 500 and the second upper reinforcing plate 600 may be provided with fastening holes 501 and 601 penetrating through the upper and lower surfaces thereof, and the rib 610 may be formed between the fastening holes 601 of the second upper reinforcing plate 600.

A heat exchanger formed by stacking and joining a plurality of tubes 130 having a refrigerant channel C, in which a heat exchange medium flows, formed therein, by joining a first plate 130a to a second plate 130b, in which the first plate 130a and the second plate 130b are provided with a first vertical portion 132 extending from a first horizontal portion at an outside where the first plate 130a and the second plate 130b are joined to each other to form a first joint portion 201 and a second horizontal portion 133 extending from the first vertical portion 132 to form a heat exchange medium channel, and the second horizontal portion 133 of the first plate 130a and the second horizontal portion 133 of the second plate 130b, which face each other, of the adjacent tubes 130 are joined to each other to form a second joint portion 202.

The second joint portion 202 may be formed on one side or both sides of the tubes 130 in a longitudinal direction.

The second joint portion 202 may extend to surround a part of a side surface in a width direction from a side surface of the tubes 130 in a longitudinal direction.

An inlet tank portion 110 and an outlet tank portion 120 formed by joining cup portions 136 formed on the first plate 130a and the second plate 130b may be formed on one side or both sides of the tubes 130 in the longitudinal direction.

The first vertical portion 132 and the second horizontal portion 133 of the first plate 130a and the second plate 130b may be formed to block at least any one of an air inflow side and an air discharge side of the core portion 100 corresponding to a bypass area B where the inlet tank portion 110 and the outlet tank portion 120 are formed and may be formed to block only a part in a longitudinal direction of an area where the tank portions 110 and 120 are formed.

The first plate 130a and the second plate 130b may be provided with a cut-away portion 139b in a form where end parts of the first vertical portion 132 and the second horizontal portion 133 on a side surface of the tubes 130 in a width direction are partially cut to be removed.

The first plate 130a and the second plate 130b may be provided with the second vertical portion 134 extending from the second horizontal portion 133.

Other features and aspects will be apparent from the following detailed description, the drawings, and the claims.

DETAILED DESCRIPTION OF MAIN ELEMENTS

Figure 1:
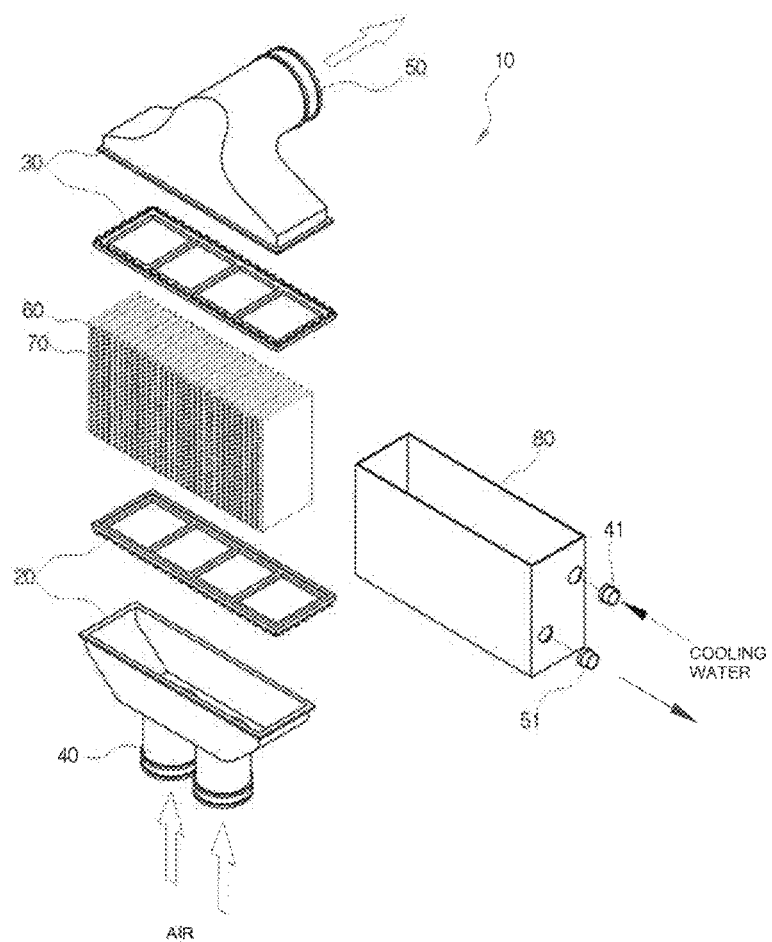
FIG. 1 is an exploded perspective view illustrating the conventional water-cooled intercooler.

1000: Heat exchanger
100: Core portion
110: Inlet header tank
111: Inlet pipe
120: Outlet header tank
121: Outlet pipe
130: Tube
130a: First plate
130b: Second plate
131: First horizontal portion
132: First vertical portion
133: Second horizontal portion
134: Second vertical portion
135: Plate
136: Cup portion
137: Flow control bead
138: Protruding bead
139a: Opening portion
139b: Cut-away portion
C: Refrigerant channel
140: Fin
200: Side reinforcing plate
201: First joint portion
202: Second joint portion
300: Blocking plate
310: Opening portion
320: Blocking portion
330: Through hole
340: Connection portion
400: Lower reinforcing plate
500: First upper reinforcing plate
501: Fastening hole
510: Coupling hole
550: Joint portion
600: Second upper reinforcing plate
601: Fastening hole
610: Rib
620: Space portion
630: Inlet portion
640: Outlet portion
641: Communication space
642: Communication hole
700: Housing
710: Air inlet
720: Air outlet
B: Bypass area
A1: Length of bypass area
A2: Length of blocking area

DETAILED DESCRIPTION OF EMBODIMENTS

Hereinafter, a heat exchanger according to an exemplary embodiment of the present invention having a configuration as described above will be described in detail with reference to the accompanying drawings.

First Exemplary Embodiment

Figure 2:
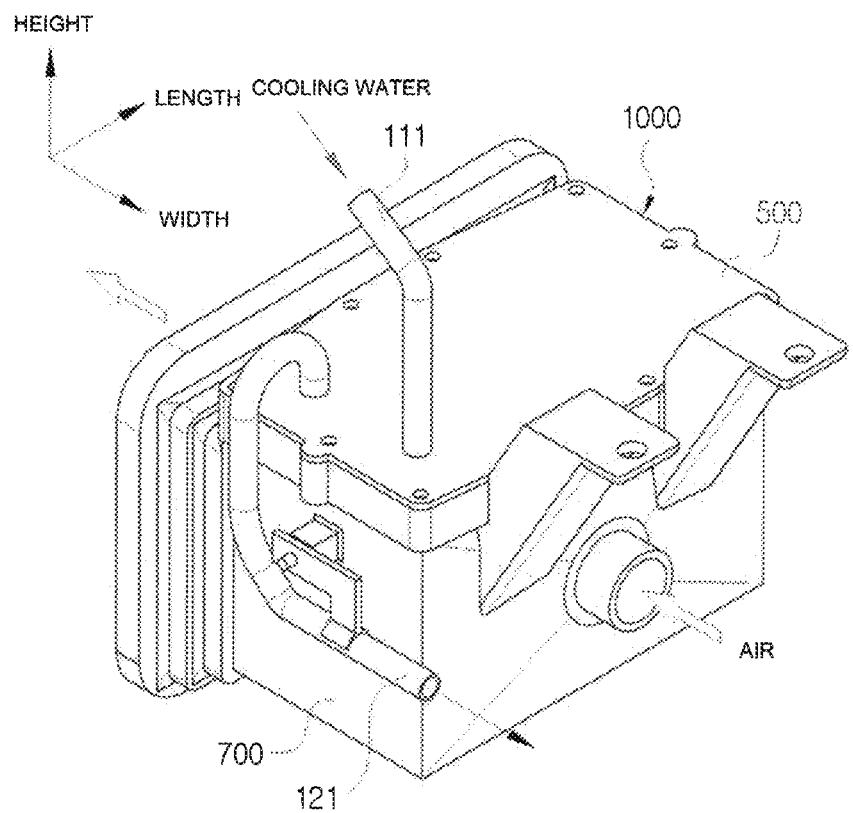
FIG. 2 is a perspective view illustrating a state in which a heat exchanger according to a first exemplary embodiment of the present invention is inserted and assembled into a housing.
Figure 3:
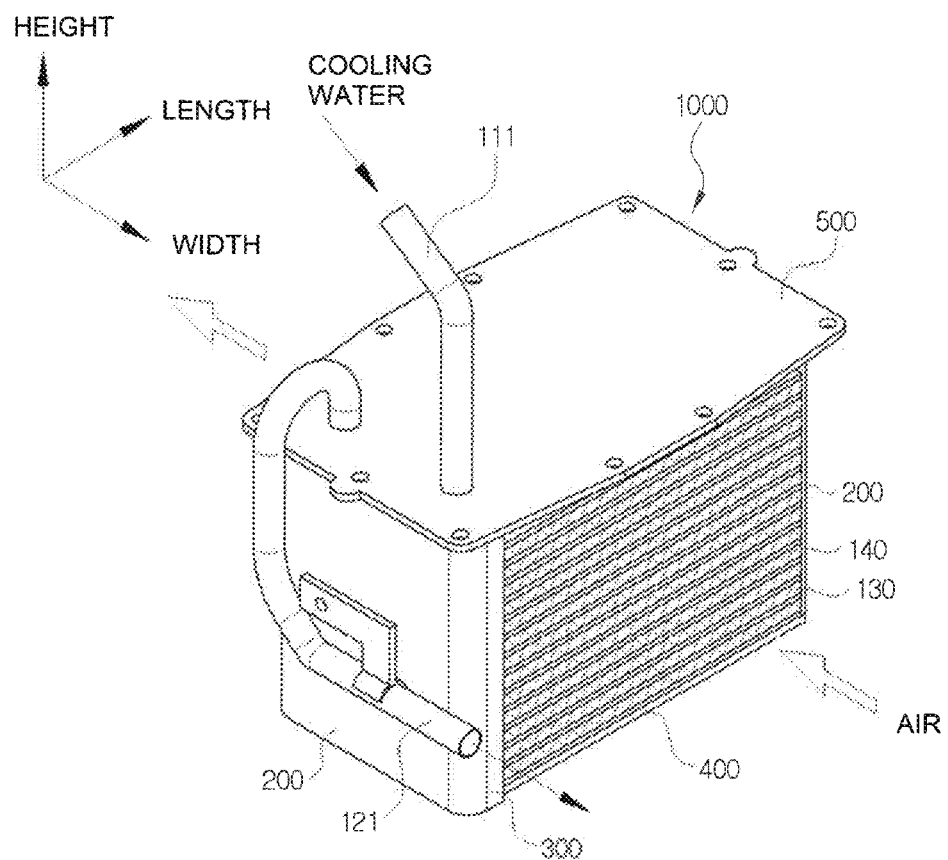
FIGS. 3 to 5 are an assembled perspective view, an exploded perspective view and a front view illustrating the heat exchanger according to the first exemplary embodiment of the present invention.
Figure 4:
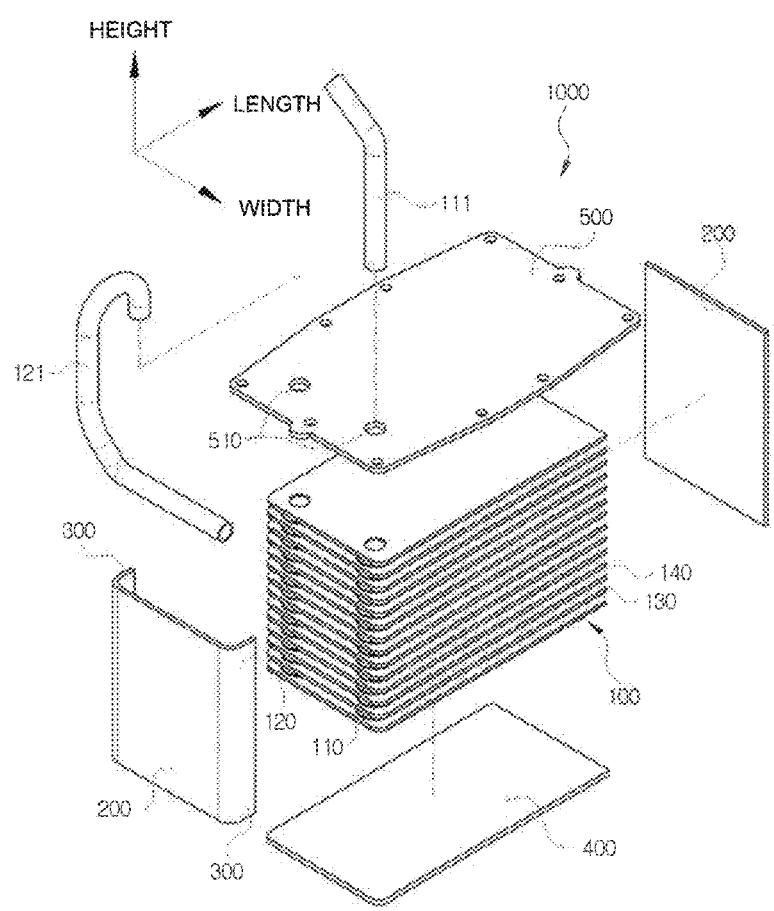
Figure 5:
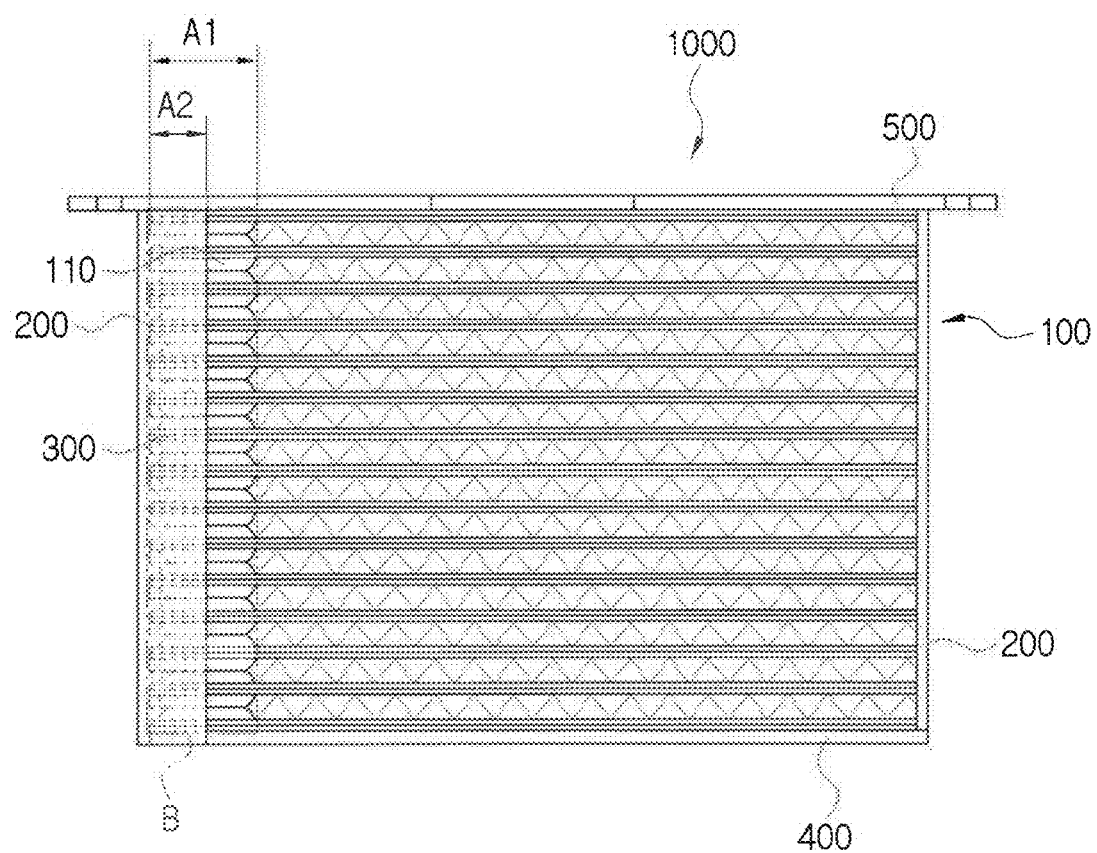

FIG. 2 is a perspective view illustrating a state in which a heat exchanger according to a first exemplary embodiment of the present invention is inserted and assembled into a housing, and FIGS. 3 to 5 are an assembled perspective view, an exploded perspective view and a front view illustrating the heat exchanger according to the first exemplary embodiment of the present invention.

A heat exchanger 1000 according to the first exemplary embodiment of the present invention as illustrated includes: a core portion 100 including an inlet header tank 110 and an outlet header tank 120 having a space, in which cooling water is stored and flows, formed therein and formed in a height direction, a plurality of tubes 130 having both ends connected to the header tanks 110 and 120 to form a cooling water channel, and fins 140 interposed between the tubes 130; a side reinforcing plate 200 disposed on a side surface of the core portion 100 in a longitudinal direction and joined to the tubes 130 of the core portion 100; and a blocking plate 300 extending from the side reinforcing plate 200 in a longitudinal direction to block an air inflow side of the core portion 100 corresponding to a bypass area B where the header tanks 110 and 120 are formed, in which the blocking plate 300 may be formed to block only a part of an area where the header tanks 110 and 120 are formed.

First, the heat exchanger 1000 according to the exemplary embodiment of the present invention may largely include the core portion 100, the side reinforcing plate 200, and the blocking plate 300.

The core portion 100 may be formed to include the inlet header tank 110, the outlet header tank 120, the tube 130, and the fin 140. The inlet header tank 110 may have cooling water, which is introduced from the outside, stored therein, may be a portion forming a space in which the cooling water may flow along an inside thereof, and may be formed in a height direction. The outlet header tank 120 is a portion forming a space in which the cooling water heat-exchanged with air passing through the core portion 100 is collected and stored and flows along the inside thereof to be discharged to the outside and may be formed in a height direction. The tubes 130 have one end connected to the inlet header tank 110 and the other end connected to the outlet header tank 120 to form a channel through which the cooling water may flow and exchange heat with air, and may be formed in parallel to each other in a longitudinal direction while being arranged to be spaced apart from each other in a height direction. At this time, the header tanks 110 and 120 and the tubes 130 may be formed in various shapes, for example, may be formed in a plate type heat exchanger in which a plurality of plates may be stacked to be integrally formed, and may be formed in an extrusion tube type heat exchanger in which a plurality of tubular tubes 130 are fixedly connected to tubular header tanks 110 and 120. The fins 140 may be interposed between the tubes 130 to increase heat exchange efficiency. For example, the fins 140 may be formed in a corrugated shape to be joined to the tubes 130.

Here, the header tanks 110 and 120 are disposed on one side or both sides of the core portion 100 in the longitudinal direction, but these drawings illustrate that the header tanks 110 and 120 are disposed on one side of the core portion 300 in a longitudinal direction, which will be described below. Further, as illustrated, the plate type heat exchanger in which the header tanks 110 and 120 and the tubes 130 are integrally formed by stacking a plurality of plates will be described. At this time, the cooling water introduced into the inlet header tank 110 flows in a U-turn form along the tube 130 to be discharged to the outside through the outlet header tank 120. Thus, the cooling water introduced from the outside may be distributed to the tubes 130 while flowing in the height direction along the inlet header tank 110 and may flow in the longitudinal direction along the tubes 130 to be U-turned and may be collected in the outlet header tank 120 to flow in the height direction and discharged to the outside. At this time, air may flow from a front side to a rear side of the core portion 100 in a width direction, and air may be configured to be cooled by exchanging heat while passing between the tubes 130.

The side reinforcing plate 200 may be disposed on the side surface of the core portion 100 in the longitudinal direction and may be formed of plates parallel to each other in a width direction which is the flowing direction of air and parallel to each other in the height direction to be joined to the tubes 130 of the core portion 100. Thus, the side reinforcing plate 200 may serve to reinforce the side surface of the core portion 100.

The blocking plate 300 may extend in the longitudinal direction from the side reinforcing plate 200 and the blocking plate 300 may be formed to block the air inflow side that is the front side of the core portion 100 in a width direction and formed to block only the part in the longitudinal direction of the area where the header tanks 110 and 120 are formed. That is, the blocking plate 300 may not be formed to block the whole of the air inflow side of the core portion 100, but may be formed to block a part of the air inflow side but formed to block only the part in the longitudinal direction of the area where the header tanks 110 and 120 are formed. In other words, the blocking plate 300 has a form in which one end in the longitudinal direction is connected to the side reinforcing plate 200, and extends in the longitudinal direction of the core portion 100 and may be provided with the other end to prevent only a part of the length of the area where the header tanks 110 and 120 are formed. At this time, the bypass area B is an area corresponding to a length from one end of the core portion 100 in the longitudinal direction from the part where the header tanks 110 and 120 are formed in the longitudinal direction, and the bypass area B is not provided with the tubes 130 and the fins 140 due to the header tanks 110 and 120 and therefore is the part where the heat exchange is not smoothly generated even if air passes therethrough. Therefore, the blocking plate 300 is formed to block a part of the bypass area B and may be formed to block only the part in the longitudinal direction of the area where the header tanks 110 and 120 are formed from the side reinforcing plate 200. Here, the side reinforcing plate 200 and the blocking plate 300 may be integrally formed by bending one plate or may be formed separately and joined together.

Thus, the bypass area of the part where the inlet/output header tanks are located in the core portion is blocked and partially open, such that the reduction in the heat radiation performance may be minimized and the pressure loss of air as the fluid cooled by passing through the core portion may be reduced. In addition, the blocking plate along with the side reinforcing plate reinforcing the side surface of the core portion may serve to reinforce a corner portion meeting the side surface and the front surface of the core portion, thereby increasing the durability.

The heat exchanger 1000 may further include the blocking plate 300 that extends in a longitudinal direction from the side reinforcing plate 200 to block an air discharge side of the core portion 100 corresponding to the bypass areas B where the header tanks 110 and 120 are formed and blocks only the part in the longitudinal direction of the area where the header tanks 110 and 120 are formed.

That is, as illustrated, the blocking plate 300 is formed on both sides of the side reinforcing plate 200 in the width direction, and thus the blocking plate 300 may extend from the side reinforcing plate 200 to block a part of the air inflow side which is the front side of the core portion 100 in the width direction corresponding to the bypass area B provided with the header tanks 110 and 120 of the core portion 100 and a part of the air discharge side which is the rear side in the width direction. At this time, the blocking plate 300 disposed on the air discharge side may also be formed to block only the part in the longitudinal direction of the area where the header tanks 110 and 120 are formed from the side reinforcing plate 200.

Thus, the air passing through the core portion is allowed to pass through only an inside in the longitudinal direction based on a line connecting the end portions of the blocking plates as a boundary, thereby preventing the cooling efficiency of the air from deteriorating.

In addition, the inlet header tank 110 and the outlet header tank 120 may be disposed on one side of the core portion 100 in the longitudinal direction.

That is, as illustrated, the inlet header tank 110 and the outlet header tank 120 may be disposed on one side of the core portion 100 in the longitudinal direction to reduce the area of the bypass area B where the header tanks 110 and 120 are disposed, thereby reducing the heat exchange efficiency.

At this time, the inlet header tank 110 and the outlet header tank 120 may be disposed at the same position of the core portion 100 in the longitudinal direction. That is, the inlet header tank 110 and the outlet header tank 120 are disposed on one side of the core portion 100 in the longitudinal direction, and the header tanks 110 and 120 are disposed at the same position in the longitudinal direction, thereby reducing the area of the bypass area B.

In addition, the blocking area ratio formed so that the blocking plate 300 blocks the bypass area B may be formed in a range from 50% to 95%.

Figure 6:
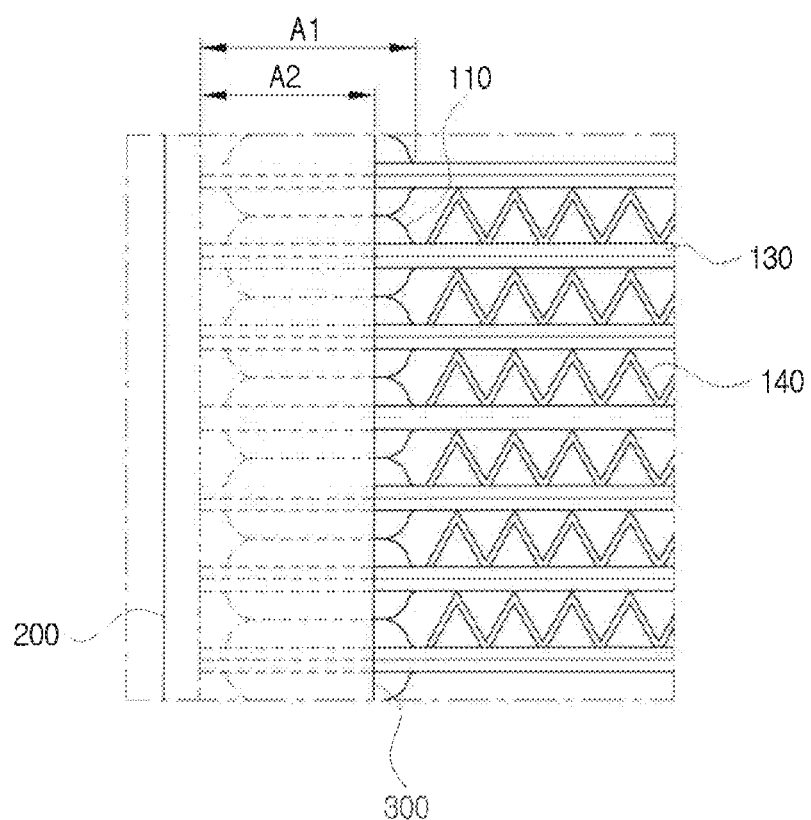
FIG. 6 is a partial enlarged view of FIG. 5.
Figure 7:
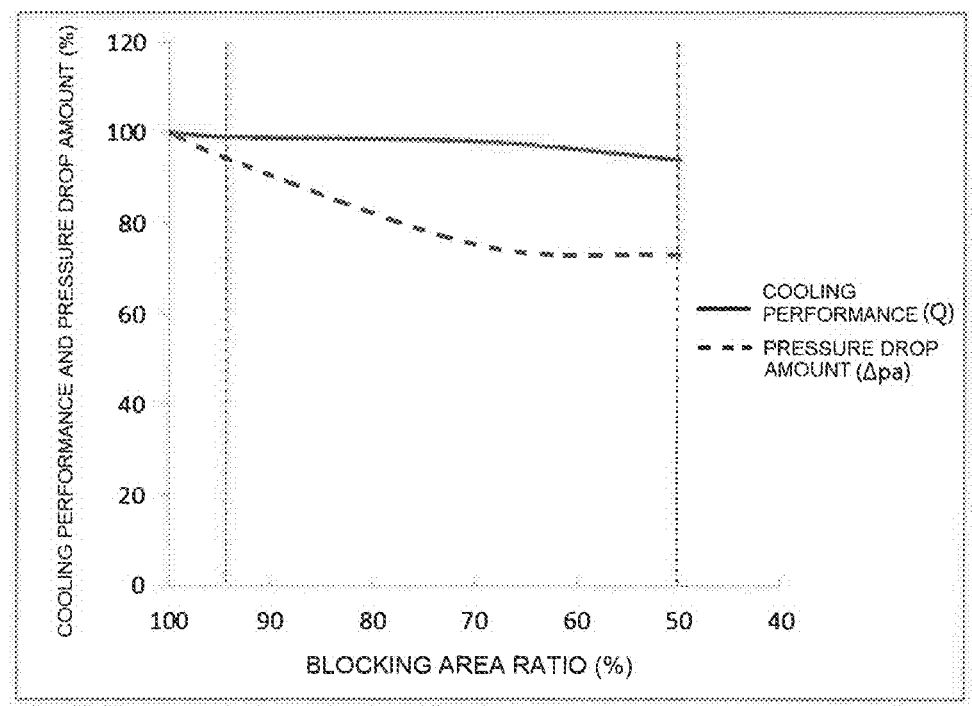
FIG. 7 is a graph illustrating cooling performance and a pressure drop amount of air depending on a blocking area ratio of a blocking plate according to an exemplary embodiment of the present invention.

That is, as illustrated in FIGS. 6 and 7, a ratio of a blocking area that is a part blocked by the blocking plate 300 in the bypass area B may be represented by a ratio (A2/A1) of a length A2 of the blocking area blocked by the blocking plate 300 to a whole length A1 of the bypass area B, and the ratio of the blocking area may be formed to be in a range from 50% to 95%.

Thus, if the ratio of the blocking area is formed to be in the range of 50% to 95% as compared with to the case where the blocking area is formed so as to block the whole bypass area B (the blocking area ratio is 100%), the cooling performance of air cooled by passing through the core portion is reduced by 3% to 5%, but the pressure drop amount may be reduced by about 30%.

In addition, the blocking plate 300 may be joined to the core portion 100.

That is, the blocking plate 300 may be joined to the surface of the core portion 100 in the width direction, and the blocking plate 300 as well as the side reinforcing plate 200 is joined to the core portion 100 to increase the structural rigidity of the core portion, thereby further increasing the durability.

In addition, the blocking plate 300 may have an opening portion 310 formed at the end part thereof in the longitudinal direction.

Figure 8:
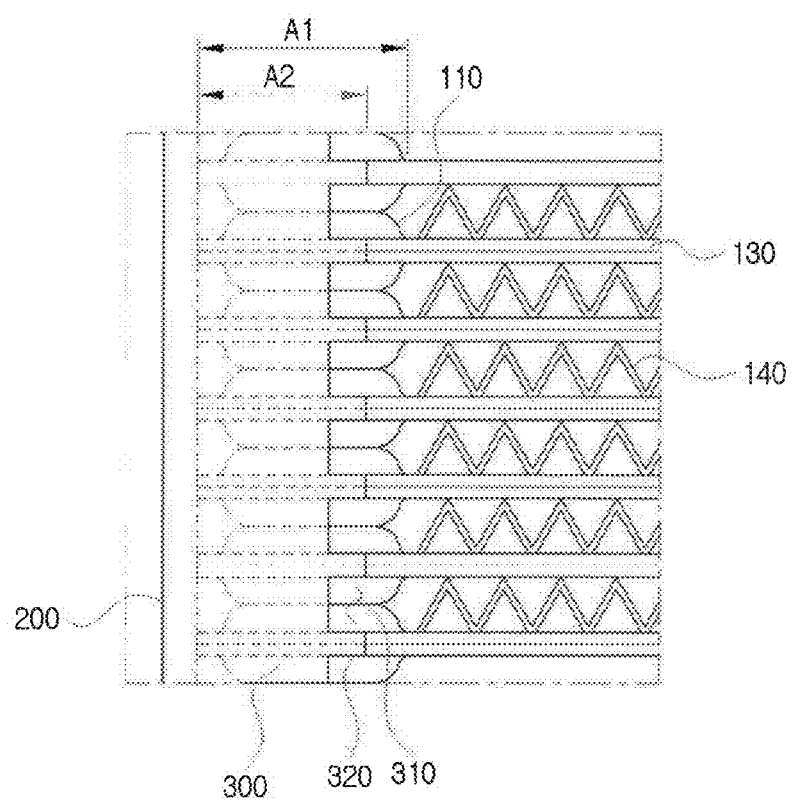
FIGS. 8 to 13 are front views and perspective views illustrating examples of the blocking plate according to the first exemplary embodiment of the present invention.
Figure 9:
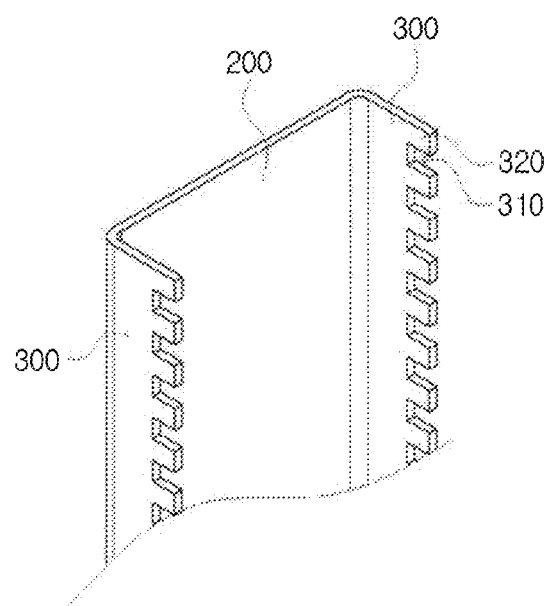

That is, as illustrated in FIGS. 8 and 9, the opposite end part where the blocking plate 300 is connected to the side reinforcing plate 200 in the longitudinal direction is provided with the opening portion partially cut, such that the blocking plate 300 may be formed to pass air through the opening portions 310. Alternatively, the end part of the blocking plate 300 in the longitudinal direction may be provided with the blocking portions 320 in the extending form, and thus the opening portion 310 may also be formed between the blocking portions 320. For example, the opening portions 310 may be spaced apart from each other in the height direction, and thus the end part of the blocking plate 300 may be formed in a rugged form or a comb shape. In addition, the blocking portions 320 may be joined to the core portion 100 to serve to reinforce the structural rigidity.

At this time, the opening portion 310 may be formed between the tubes 130 of the core portion 100 in the height direction.

That is, as illustrated, each of the opening portions 310 may be disposed at a position between the heights where the tubes 130 are formed, and the range in which each of the opening portions 310 is formed may be in a range of an interval between the tubes 130. Accordingly, the blocking portions 320 are disposed at the height where the tubes 130 are formed, and may be formed in a range corresponding to the thickness of the tubes 130.

Thus, the air introduced into the core portion 100 by passing through the opening portion 310 is guided to flow into the space between the tubes 130, thereby increasing the durability of the core portion while reducing the pressure loss of air.

Figure 10:
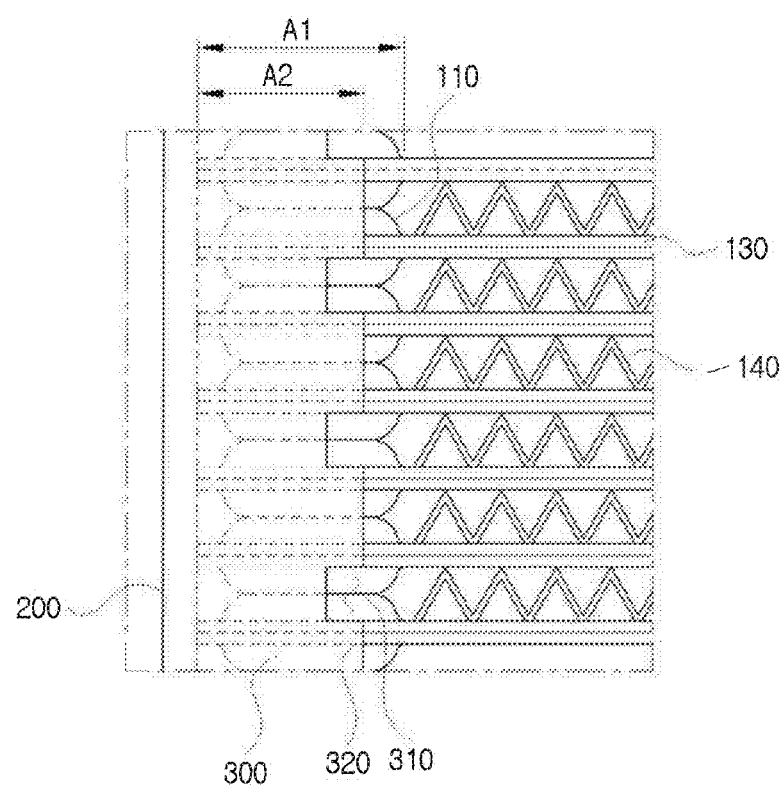
Figure 11:
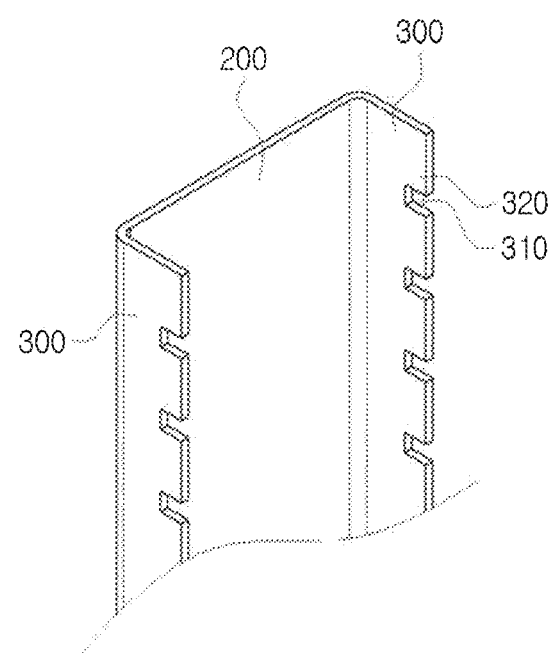

As illustrated in FIGS. 10 and 11, the opening portions 310 may alternately be formed between the tubes 130.

In addition, the blocking plate 300 may have through holes 330, which are spaced apart from each other, formed at the end part thereof in the longitudinal direction.

Figure 12:
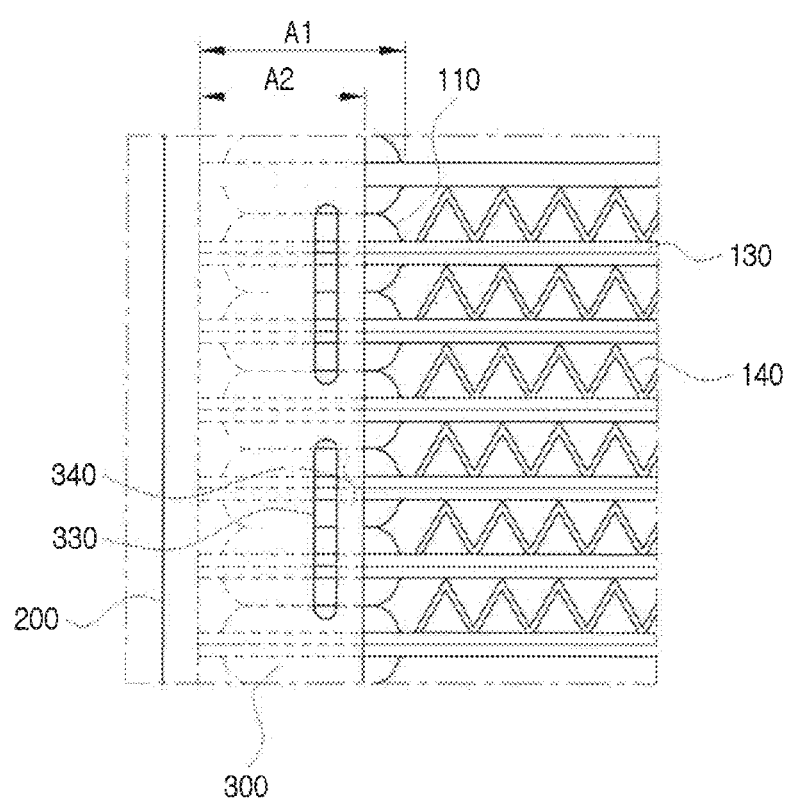
Figure 13:
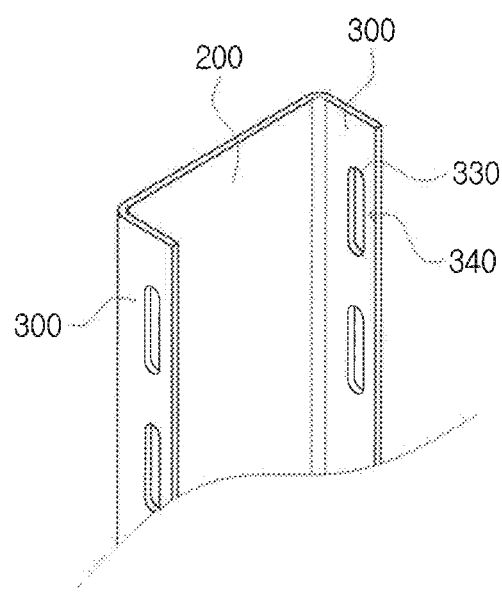

That is, as illustrated in FIGS. 12 and 13, the through holes 330 may be spaced apart from each other at the end part of the blocking plate 300 in the longitudinal direction, such that air may pass through the through hole 330. Thus, the blocking portion 320 and a connection portion 340 may be formed by the through holes 330, and the through hole 330 may be formed in plural and may also be formed in a slot form extending in a height direction. At this time, the blocking portion 320 and the connection portion 340 may also be joined to the core portion 100.

Thus, compared to forming the opening portion through which air may pass, the structural rigidity of the blocking plate may be increased, thereby increasing the durability of the core portion while reducing the pressure loss of air.

In addition, a lower reinforcing plate 400 joined to a lower side of the core portion 100 in the height direction; and a first upper reinforcing plate 500 joined to the upper side of the core portion 100 in the height direction may be further provided, in which side reinforcing plates 200 are joined to both sides of the core portion 100 in the longitudinal direction, and thus the lower side of the side reinforcing plates 200 may be joined to the lower reinforcing plate 400 and the upper side of the side reinforcing plates 200 may be joined to the first upper reinforcing plate 500.

That is, the lower surface of the core portion 100 that is the lower side in the height direction may be joined to the lower reinforcing plate 40, the upper surface of the core portion 100 that is the upper side in the height direction may be joined to the first upper reinforcing plate 500, and the side reinforcing plate 200 may be formed on a left side surface and a right side surface of the core portion 100, respectively, that are both sides in a longitudinal direction to be joined to the core portion. The lower sides of the side reinforcing plates 200 may be joined to the lower reinforcing plate 400 and the upper sides thereof may be joined to the first upper reinforcing plate 500.

Thus, since the reinforcing plates are joined to surround the upper, lower, right, and left surfaces of the core portion, the core portion may be prevented from being deformed even if the high-temperature and high-pressure air passes between the tubes, thereby increasing the durability of the core portion.

The first upper reinforcing plate 500 may be formed to be wider than the upper surface of the core portion 100, and a circumferential part of the first upper reinforcing plate 500 is provided with fastening holes penetrating through the upper and lower portions thereof, and thus the core portion 100 is inserted into the housing 700 formed to pass air therethrough and then the first upper reinforcing plate 500 may be joined to the housing 700 by the fastening means.

Further, an inlet pipe 111 connected to the inlet header tank 110 of the core portion 100 and an outlet pipe 121 connected to the outlet header tank 120 are further provided, and the inlet pipe 111 and the outlet pipe 121 may be joined to each other to penetrate through the first upper reinforcing plate 500.

That is, the inlet pipe 111 may be connected to the inlet header tank 110 of the core portion 100, and the outlet pipe 121 may be joined to the outlet header tank 120 of the core portion 100. At this time, the inlet pipe 111 and the outlet pipe 121 may be joined to each other to penetrate through a coupling hole 510 formed to penetrate through the first upper reinforcing plate 500, and the inlet pipe 111 and the outlet pipe 121 may be fixedly joined to the first upper reinforcing plate 500 by brazing, welding or the like.

Second Exemplary Embodiment

Figure 14:
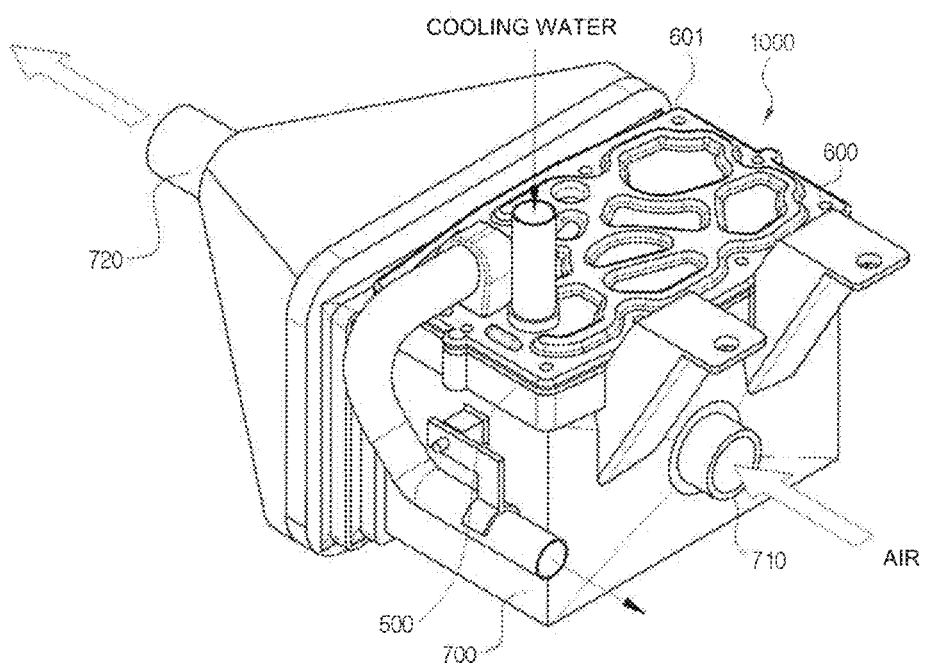
FIG. 14 is a perspective view illustrating a state in which a heat exchanger according to a second exemplary embodiment of the present invention is inserted and assembled into a housing.
Figure 15:
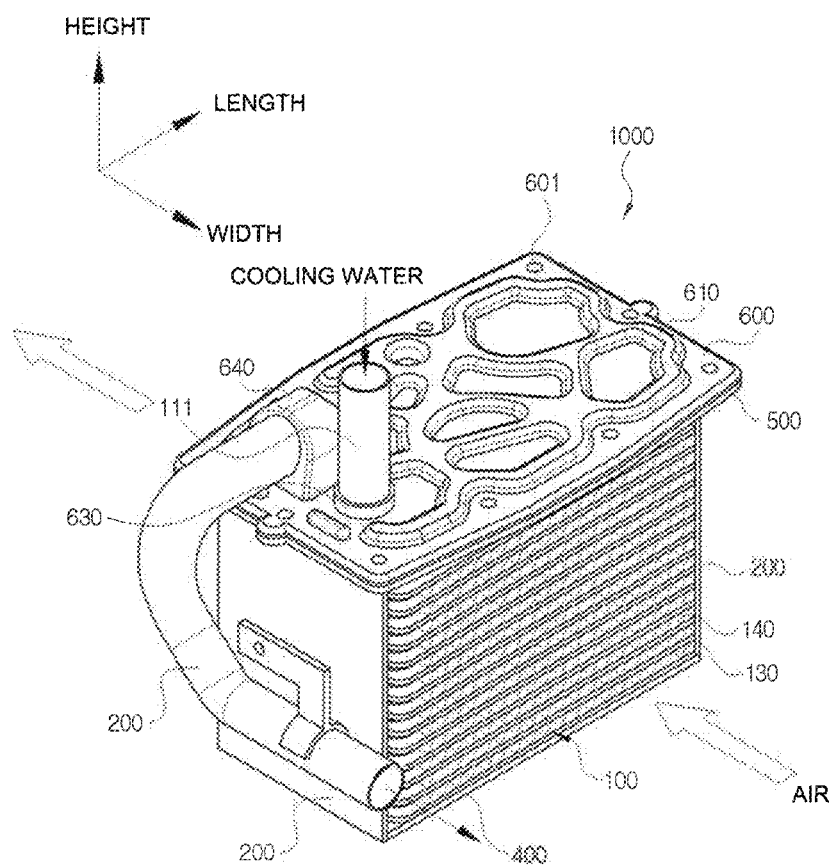
FIGS. 15 to 17 are an assembled perspective view, an exploded perspective view and a partial cross-sectional view illustrating the heat exchanger according to the second exemplary embodiment of the present invention.
Figure 16:
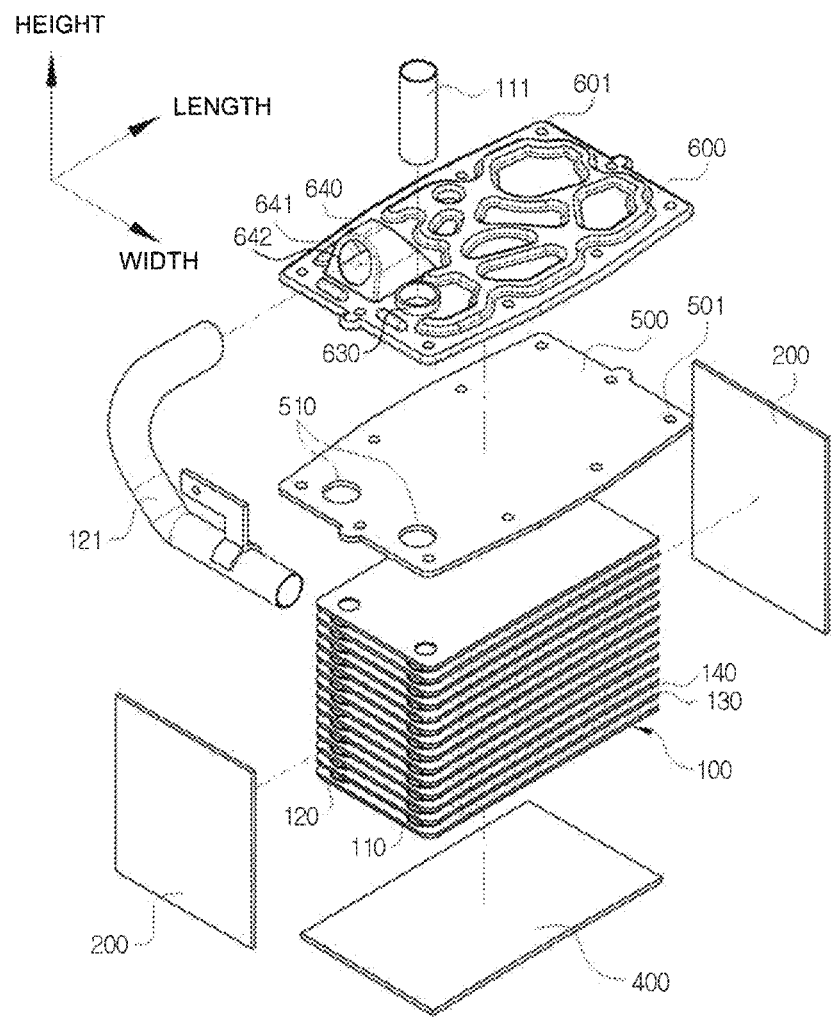
Figure 17:
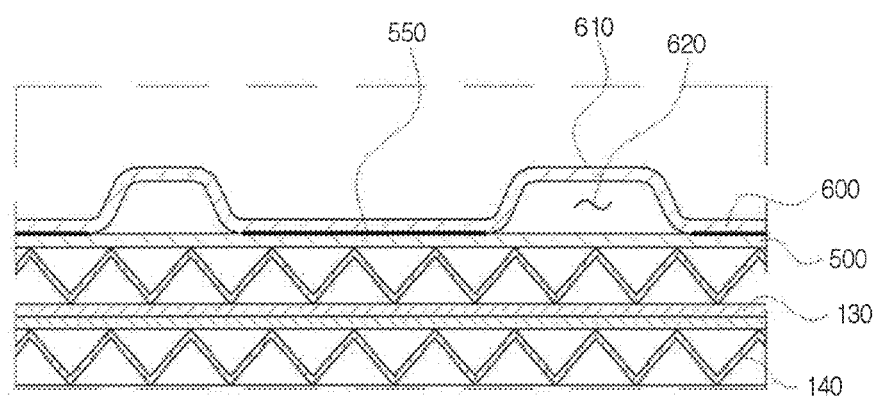
Figure 18:
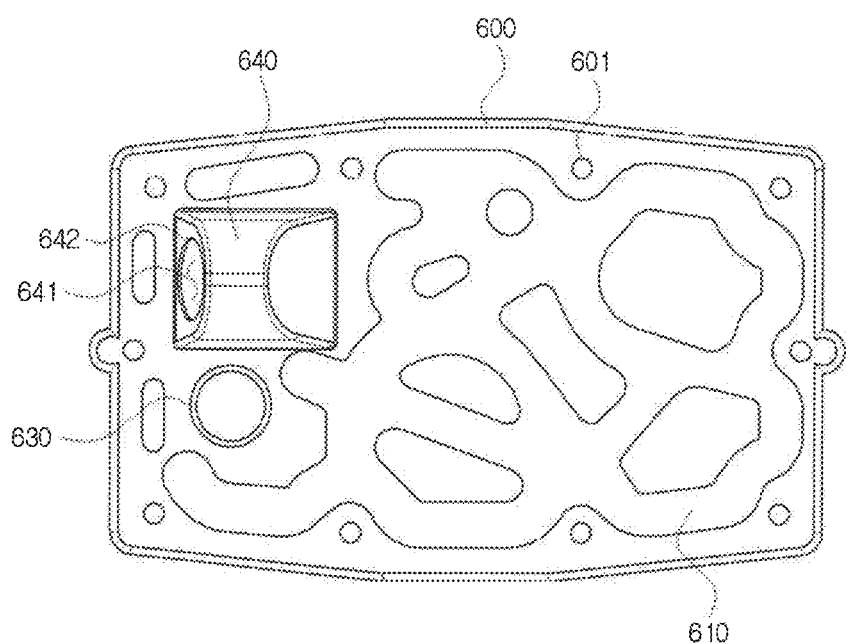
FIGS. 18 and 19 are plan views illustrating shapes of ribs formed on a second upper reinforcing plate having a joint ratio of 45% and 60% according to the second exemplary embodiment of the present invention.
Figure 19:
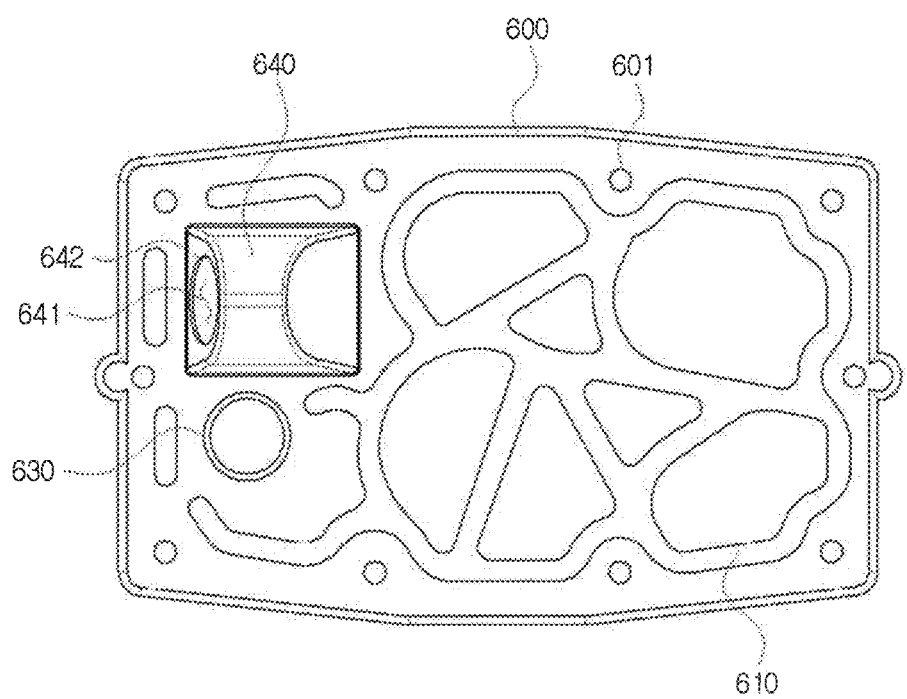
Figure 20:
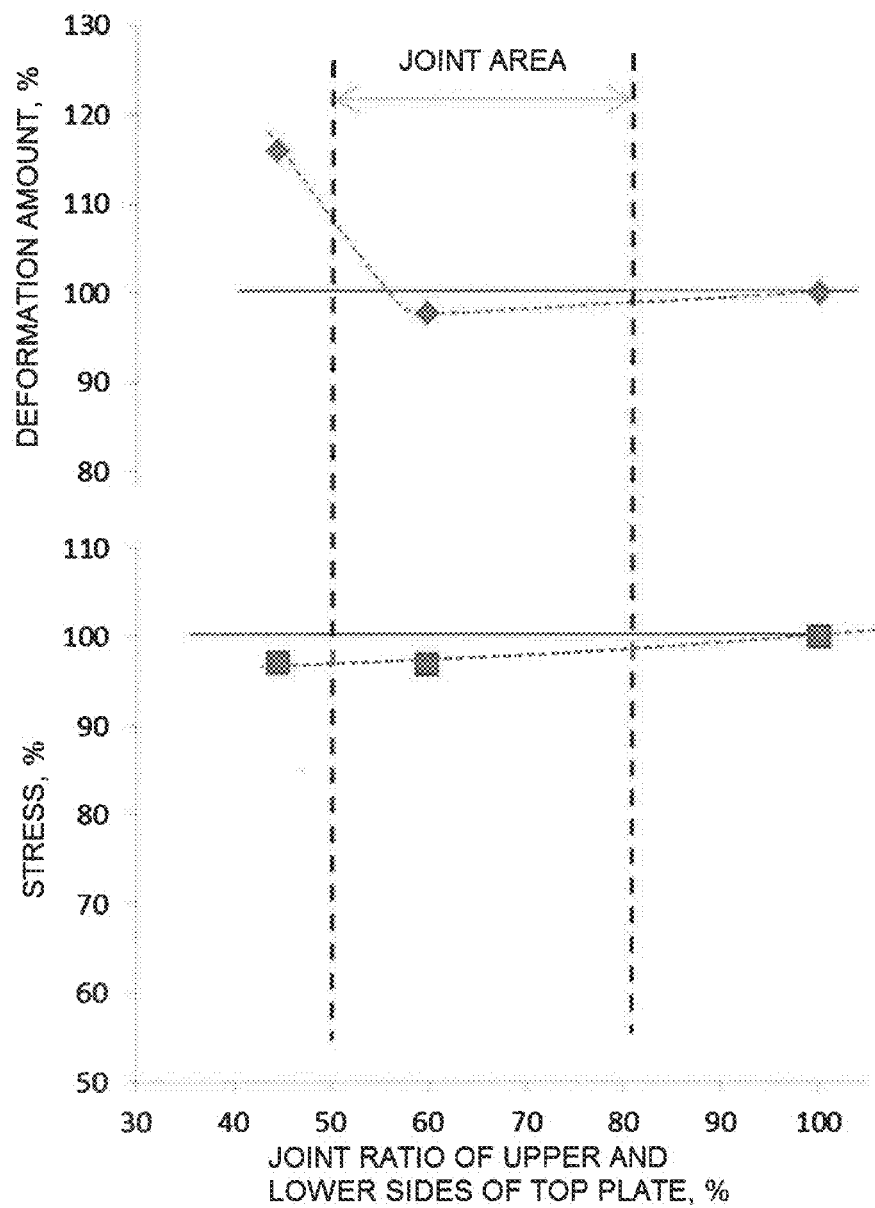
FIG. 20 is a graph illustrating stresses and strains of a top plate formed by joining a first upper reinforcing plate to a second upper reinforcing plate depending on a joint ratio according to the second exemplary embodiment of the present invention.
Figure 21:
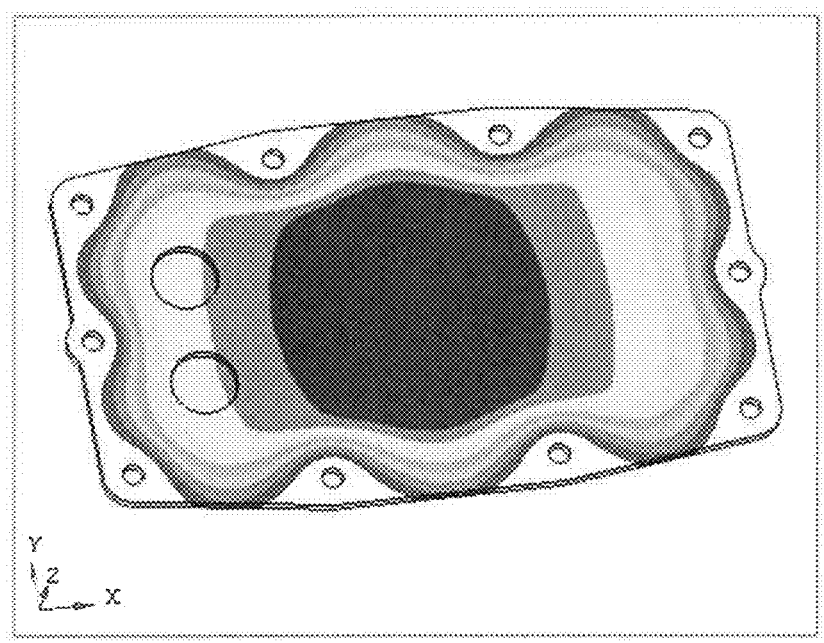
FIG. 21 is a view illustrating a stress distribution of the conventional top plate formed of a single flat plate.

FIG. 14 is a perspective view illustrating a state in which a heat exchanger according to a second exemplary embodiment of the present invention is inserted and assembled into a housing, and FIGS. 15 to 17 are an assembled perspective view, an exploded perspective view and a partial cross-sectional view illustrating the heat exchanger according to the second exemplary embodiment of the present invention.

As illustrated, a heat exchanger 1000 according to a second exemplary embodiment of the present invention includes a core portion 100 including an inlet header tank 110 and an outlet header tank 120 having a space, in which cooling water is stored and flows, formed therein and formed in a height direction, a plurality of tubes 130 having both ends connected to the header tanks 110 and 120 to form a cooling water channel, and fins 140 interposed between the tubes 130; a first upper reinforcing plate 500 joined to an upper side of the core portion 100 and formed in a plate shape; and a second upper reinforcing plate 600 having a rib 610 protruding upwardly and having a space portion 620 depressed at an opposite side to the side where the rib 610 protrudes.

First, the heat exchanger 1000 of the present invention may be provided with the core portion 100 so that cooling water may flow therein. The second upper reinforcing plate 600 may be joined to the upper side of the plate-shaped first upper reinforcing plate 500 to be formed as a top plate, and the top plate may be joined to the upper surface of the core portion 100.

The core portion 100 may be formed to include the inlet header tank 110, the outlet header tank 120, the tube 130, and the fin 140. The inlet header tank 110 may store cooling water introduced from the outside, may be a portion forming a space in which the cooling water may flow along an inside thereof, and may be formed in the height direction. The outlet header tank 120 is a portion forming a space in which the cooling water heat-exchanged with air passing through the tubes 130 and the fins 140 of the core portion 100 is collected and stored and flows along the inside thereof to be discharged to the outside and may be formed in the height direction. The tubes 130 have one end connected to the inlet header tank 110 and the other end connected to the outlet header tank 120 to form a channel through which the cooling water may flow and exchange heat with air, and may be formed in parallel to each other in a longitudinal direction while being arranged to be spaced apart from each other in the height direction. At this time, the header tanks 110 and 120 and the tubes 130 may be formed in various shapes, for example, may be formed in a plate type heat exchanger in which a plurality of plates may be stacked to be integrally formed, and may be formed in an extrusion tube type heat exchanger in which a plurality of tubular tubes 130 are fixedly connected to tubular header tanks 110 and 120. The fins 140 may be interposed between the tubes 130 to increase heat exchange efficiency. For example, the fins 140 may be formed in a corrugated shape to be joined to the tubes 130.

Here, the header tanks 110 and 120 are disposed on one side or both sides of the core portion 100 in the longitudinal direction, but these drawings illustrate that the header tanks 110 and 120 are disposed on one side of the core portion 300 in the longitudinal direction, which will be described below. Further, as illustrated, the plate type heat exchanger in which the header tanks 110 and 120 and the tubes 130 are integrally formed by stacking the plurality of plates will be described. At this time, the cooling water introduced into the inlet header tank 110 flows in a U-turn form along the tube 130 to be discharged to the outside through the outlet header tank 120. Thus, the cooling water introduced from the outside may be distributed to the tubes 130 while flowing in the height direction along the inlet header tank 110 and may flow in the longitudinal direction along the tubes 130 to be U-turned and may be collected in the outlet header tank 120 to flow in the height direction and discharged to the outside. Air may flow from a front side to a rear side of the core portion 100 in a width direction, and air may be configured to be cooled by exchanging heat while passing between the tubes 130 and the fins 140.

The first upper reinforcing plate 500 may be formed of, for example, a flat plate and may be joined to an upper surface that is the upper side of the core portion 100. For example, the first upper reinforcing plate 500 may be joined to the core portion 100 by brazing or the like. The first upper reinforcing plate 500 is provided with coupling holes 510 through which the inlet header tank 110 or the outlet header tank 120 may be connected to each other. Thus, the structural rigidity of the core portion 100 may be increased by the first upper reinforcing plate 500.

The second upper reinforcing plate 600 may be joined to the upper surface that is the upper side of the first upper reinforcing plate 500. For example, the second upper reinforcing plate 600 may be joined to the first upper reinforcing plate 500 by the brazing. At this time, the second upper reinforcing plate 600 is the flat plate form and may be provided with the rib 610 protruding upwardly from the upper surface, and may be provided with the space portion 620 depressed from the lower surface so that the opposite side where the rib 610 is formed corresponds to the protruding shape of the rib 610. Thus, the lower surface of the second upper reinforcing plate 600 except for the part where the space portion 620 is formed may contact the upper surface of the first upper reinforcing plate 500 and the second upper reinforcing plate 600 is joined to the first upper reinforcing plate 500 by brazing or the like to form a joint portion 550, and the first upper reinforcing plate 500 and the second upper reinforcing plate 600 may be joined to each other to be formed as one top plate.

Accordingly, the structural rigidity of the core portion 100 is greatly increased by the first upper reinforcing plate 500 and the second upper reinforcing plate 600 joined thereto, thereby preventing the core portion 100 and the top plate from being deformed.

Here, as compared with a case where one flat plate having a thickness of 3t is used as a top plate as in the related art, when one of two flat plates having a thickness of 1.5t according to the present invention is provided with a rib and the two plates joined to each other are used, the same amount of material is used, so that the structural rigidity of the top plate itself may be increased without increasing the weight, thereby preventing the top plate and the core portion from being deformed.

In addition, the circumference of the first upper reinforcing plate 500 and the circumference of the second upper reinforcing plate 600 may be formed to coincide with each other, and a ratio of the area where the first upper reinforcing plate 500 and the second upper reinforcing plate 600 are joined to each other may be 50% to 80%.

That is, the circumferential (outside) form of the first upper reinforcing plate 500 and the circumferential (outside) form of the second upper reinforcing plate 600 may be formed to be the same as each other and thus the first upper reinforcing plate 500 and the second upper reinforcing plate 600 may be joined to each other so that the circumferences thereof coincide with each other. In this case, referring to FIG. 8, the joint ratio which is the ratio of the area where the two boards are joined to each other may be in the range of 50% to 80%, and as compared to the case (that is, the case where the two boards are formed in a flat plate and thus the whole surface is joined) where the joint ratio of the area where the two boards are joined to each other is 100%, it is preferable to have the range in order to have the more appropriate deformation amount and stress range. At this time, to prevent the top plate formed by joining the first upper reinforcing plate 500 and the second upper reinforcing plate 600 to each other from being deformed, it is preferable that the joint ratio in which the deformation amount is small is formed to be about 55% or more as compared to the case in which the joint ratio is 100% as the graph illustrated.

In addition, the second upper reinforcing plate 600 may be provided with the rib 610 and the space 620 integrally formed by pressing one board.

That is, the second upper reinforcing plate 600 is provided with the rib 610 so that the rib 610 protrudes upwardly from the upper surface on the flat-shaped plate by performing plastic working such as pressing and hot press forming on one board, and the part where the rib 610 is formed may be integrally provided with the space portion 620 depressed upwardly from the lower surface.

Accordingly, the shape of the second upper reinforcing plate 600 may be easily manufactured, and various rib shapes may be formed.

In addition, the first upper reinforcing plate 500 and the second upper reinforcing plate 600 may be formed to be wider in the width direction and the longitudinal direction than the upper surface of the core portion 100, the circumferential parts of the first upper reinforcing plate 500 and the second upper reinforcing plate 600 may be provided with fastening holes 501 and 601 penetrating through the upper and lower surfaces thereof, and the rib 610 may be formed between the fastening holes 601 of the second upper reinforcing plate 600.

That is, as illustrated, the first upper reinforcing plate 500 and the second upper reinforcing plate 600 are formed to be wider than the core portion 100 in the form in which they protrude outwardly from both surfaces of the core portion 100 in the width direction and the longitudinal direction, such that the circumferential parts of the first upper reinforcing plate 500 and the second upper reinforcing plate 600 that are the protruding parts may be provided with the fastening holes 501 and 601 penetrating therethrough and may be joined to the housing 700 through the fastening holes by the fastening means or the like. As illustrated, the rib 610 may be formed between the fastening holes 601 of the second upper reinforcing plate 600.

Figure 22:
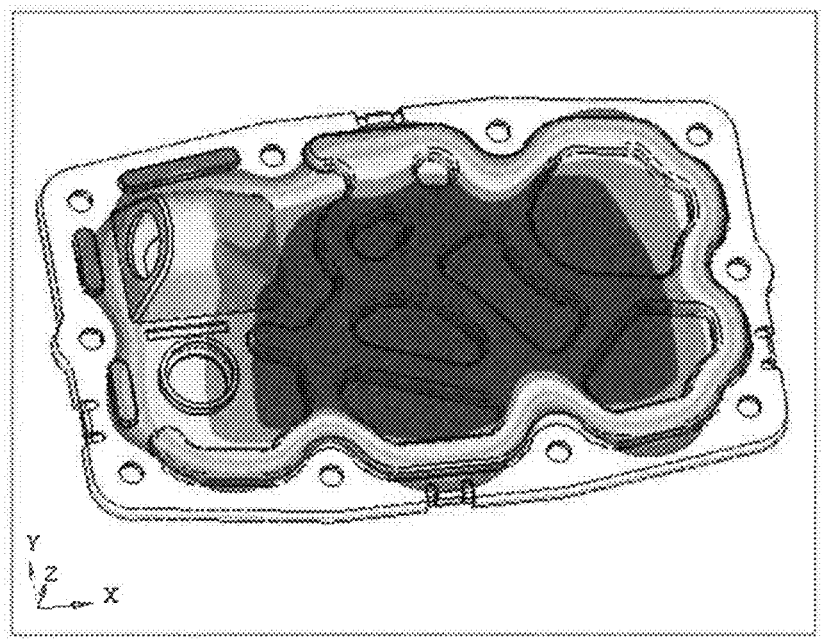
FIGS. 22 and 23 are views illustrating a stress distribution in a case where the top plate formed by joining the first upper reinforcing plate to the second upper reinforcing plate is formed at the same thickness as the conventional single flat plate according to the second exemplary embodiment of the present invention and has a joint ratio of 45% and 60%, respectively.
Figure 23:
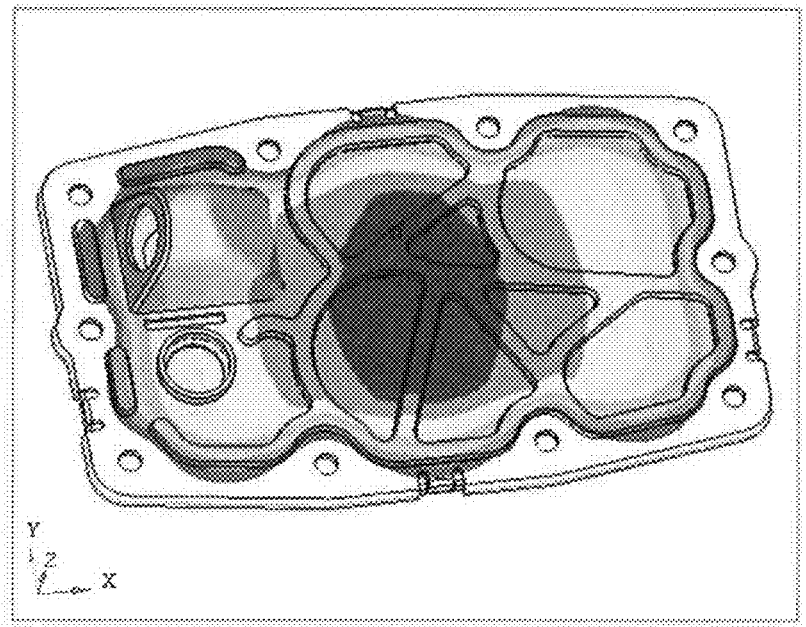
Figure 24:
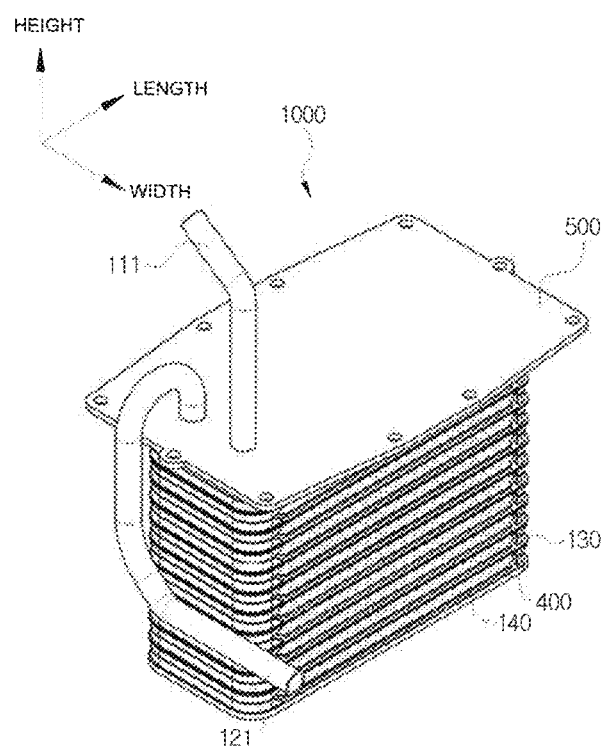
FIGS. 24 to 27 are an assembled perspective view, exploded perspective views and a front cross-sectional view illustrating a heat exchanger according to a third exemplary embodiment of the present invention.
Figure 25:
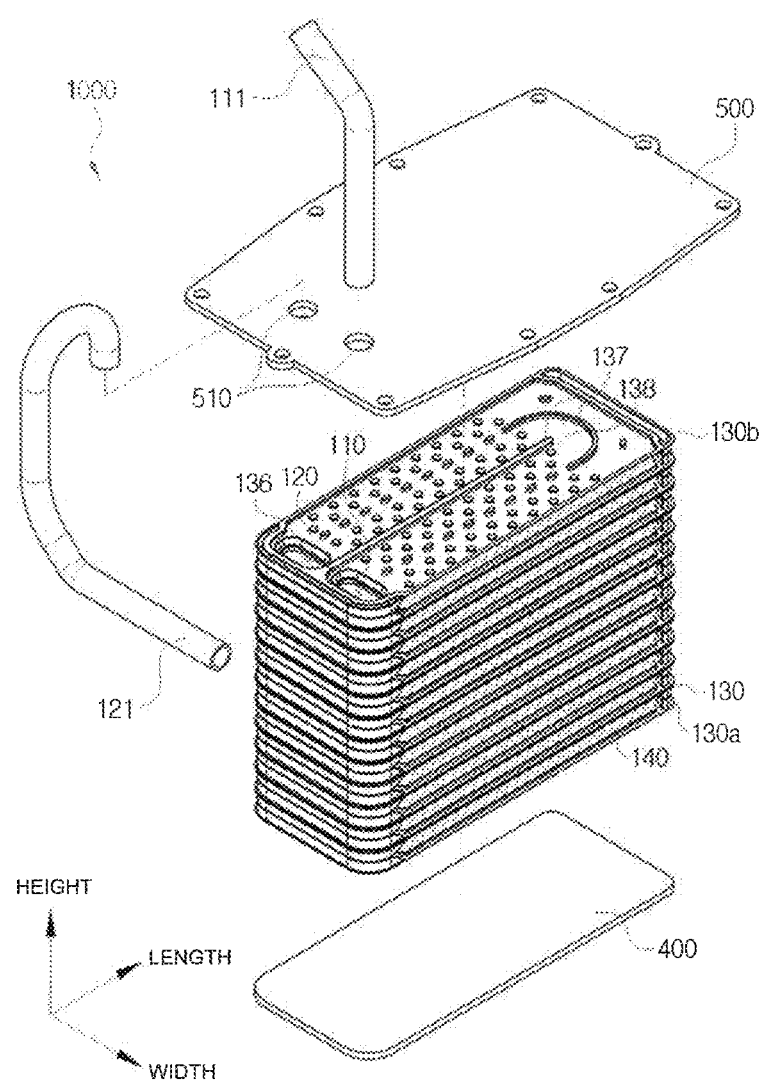
Figure 26:
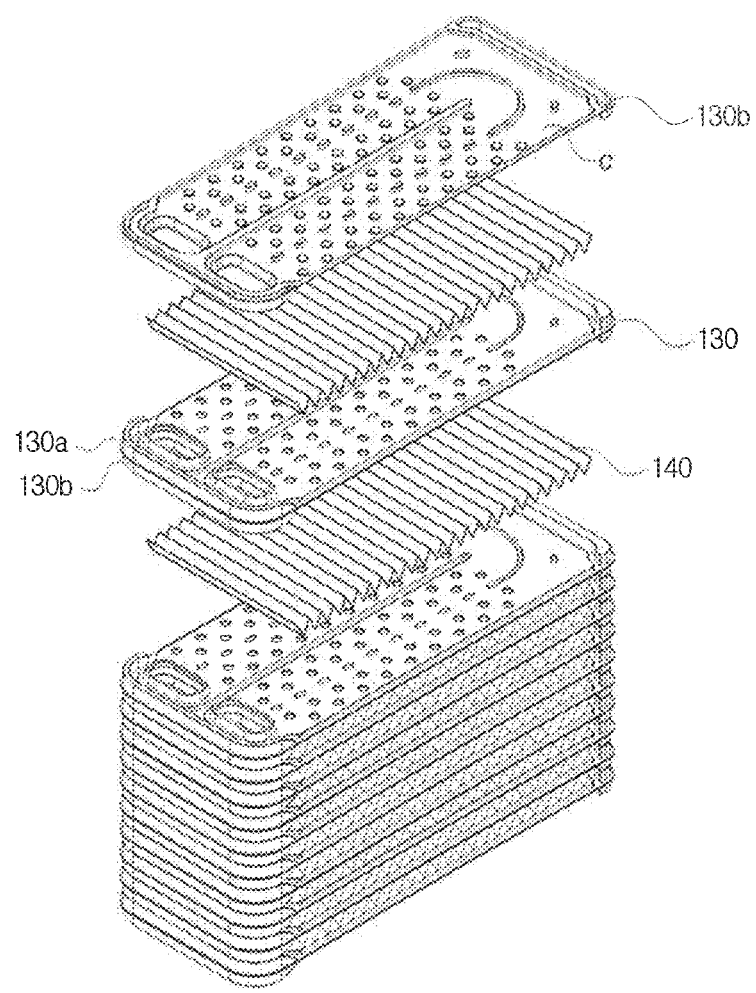
Figure 27:
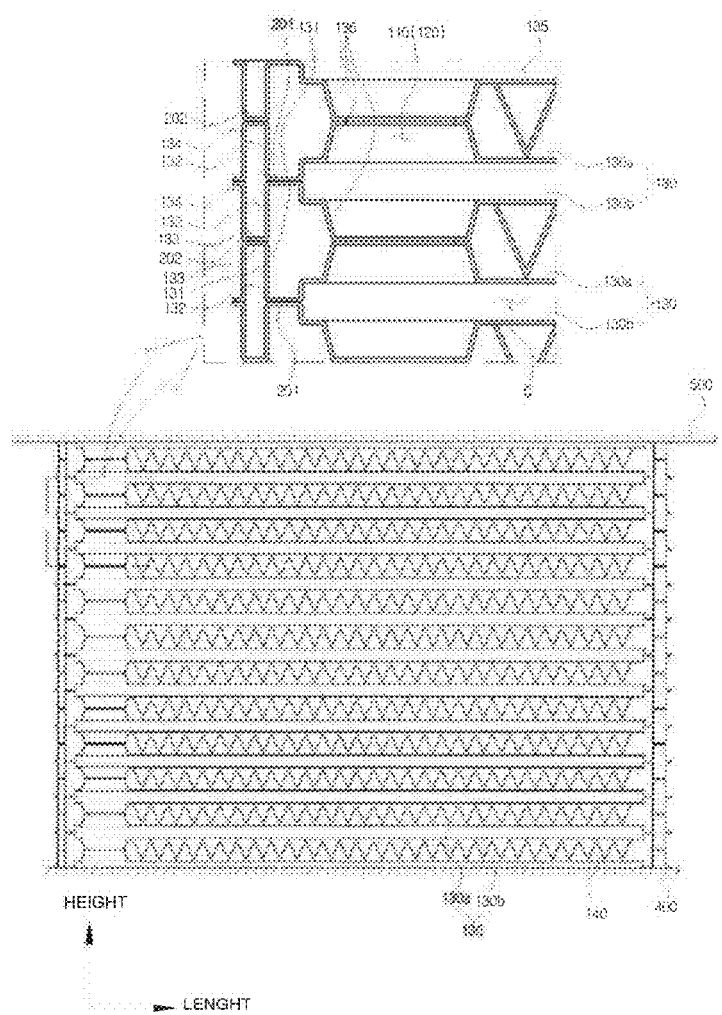
Figure 28:
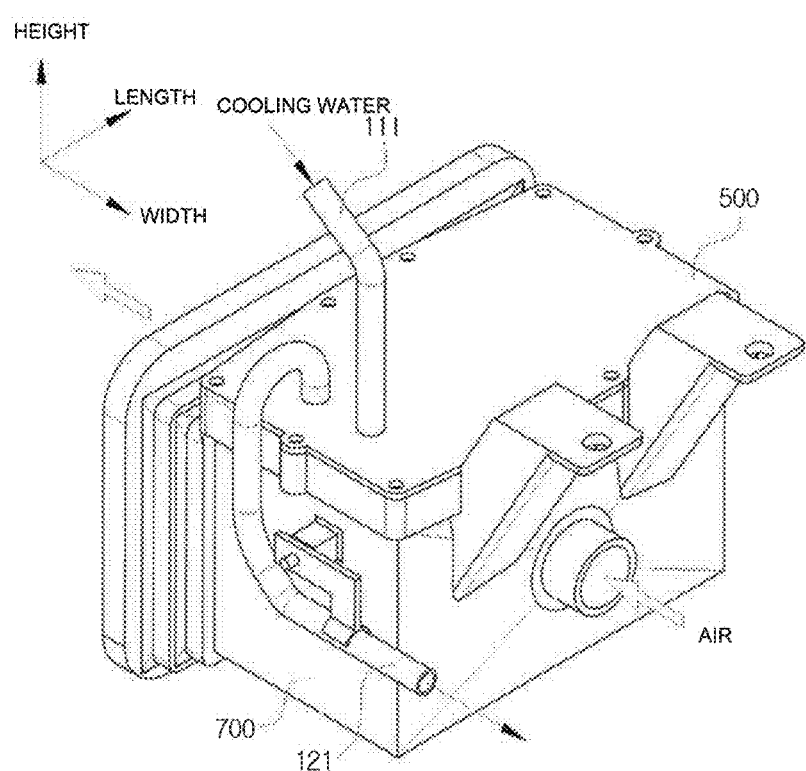
FIG. 28 is an assembled perspective view of the heat exchanger including a housing according to the third exemplary embodiment of the present invention.
Figure 29:
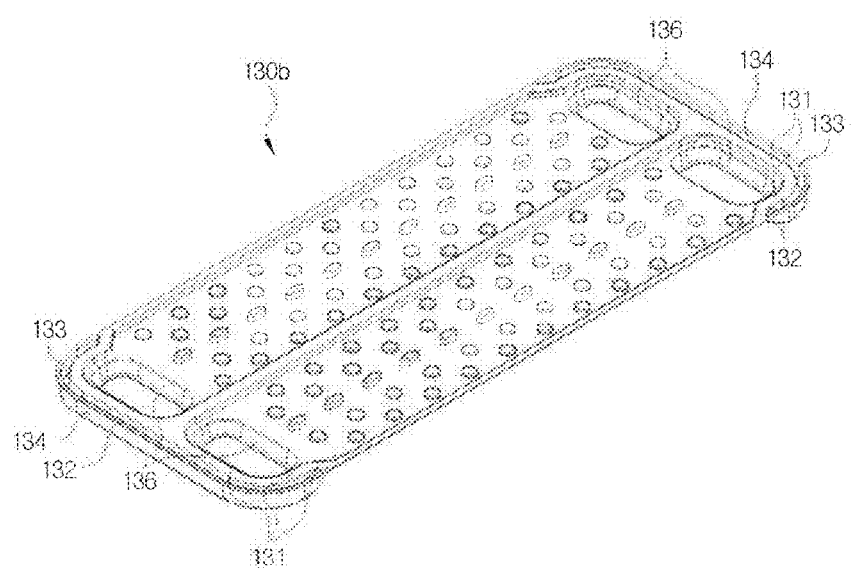
FIG. 29 is a perspective view illustrating another example of a second plate configuring a tube according to the third exemplary embodiment of the present invention.

Thus, the strength between the fastening holes 601 becomes large, such that the deformation of the part between the fastening holes 601, which is a part not fastened to the housing 700, may be prevented. That is, as illustrated in FIG. 22, it can be appreciated that when one board having no ribs formed therein is used as a top plate and fastened to the housing, stress is applied to the position between the fastening holes on the top plate due to the high-pressure air passing through the inside of the housing 700 and stress is applied to the circumferential edge of the board. On the other hand, as illustrated in FIGS. 22 and 23, when the top plate formed by joining the second upper reinforcing plate 600 provided with the ribs 610 according to the second exemplary embodiment of the present invention to the first upper reinforcing plate 500 having a flat plate shape is fastened with the housing 700, it can be appreciated that stress is applied only to the part where the rib 610 that is the part spaced apart from the circumferential edge of the board is formed and stress is smaller at the position between the fastening holes 610 as illustrated.

In addition, any one of the first upper reinforcing plate 500 and the second upper reinforcing plate 600 may be formed of a clad board.

That is, the first upper reinforcing plate 500 may be joined to the upper surface of the core portion 100 and the second upper reinforcing plate 600 may be joined to the upper surface of the first upper reinforcing plate 500. Therefore, for example, the first upper reinforcing plate 500 and the second upper reinforcing plate 600 may be formed of a clad board in which the lower surface of the first upper reinforcing plate 500 and the lower surface of the second upper reinforcing plate 600 may each be provided with a clad layer. Alternatively, the first upper reinforcing plate 500 may be formed of the clad board in which the clad layer is formed on both upper and lower surfaces of the first upper reinforcing plate 500. Alternatively, the clad layer may be formed on the upper surface of the core portion 100 and the clad layer may also be formed on the lower surface of the second upper reinforcing plate 600.

In addition, the second upper reinforcing plate 600 may be provided with a tubular inlet portion 630 protruding upwardly and connected to the inlet pipe ill.

That is, as illustrated, the inlet portion 630 is formed to protrude upwardly from the upper surface of the second upper reinforcing plate 600, and the inlet portion 630 may be formed in a tubular shape and formed to be penetrated in the vertical direction.

Thus, the inlet pipe 111 may be easily assembled with the second upper reinforcing plate 600, the inlet pipe 11 may be easily joined to the second upper reinforcing plate 600 by brazing or the like, and the structural rigidity of the second upper reinforcing plate 600 may be more increased by the inlet portion 630.

Further, the second upper reinforcing plate 600 protrudes upwardly and the opposite side may be provided with the outlet portion 640 concavely formed.

That is, the outlet portion 640 may protrude upwardly from the upper surface of the second upper reinforcing plate 600 similar to the rib 610, and the lower portion may be concavely formed upwardly from the lower surface to be formed in a dome form. The outlet portion 640 may be provided with a communication hole 642 penetrated so that the outlet pipe 121 is connected thereto.

Thus, like the inlet portion 630, the structural rigidity of the second upper reinforcing plate 600 may be further increased by the outlet portion 640.

Further, the communication hole 642 to which the outlet pipe 121 is connected is formed on the side surface of the outlet portion 640 in the width direction or the longitudinal direction.

That is, as illustrated, the communication hole 642 is formed on the longitudinal side surface of the outlet portion 640 so that the outlet pipe 121 may be connected to the communication hole 642.

Thus, the structure of the outlet pipe 121 may be simplified, and the outlet pipe 121 may be easily assembled and joined to the outlet portion 640. In addition, the outlet pipe 121 may also be joined to the outlet portion 640 by brazing or the like.

In the heat exchanger 1000 according to the present invention, the side reinforcing plate 200 may be disposed on the longitudinal side surface of the core portion 100 and may be formed of the plates parallel to each other in the width direction which is the flowing direction of air and parallel to each other in the height direction to be joined to both side surfaces of the core portion 100 in the longitudinal direction. At this time, the side reinforcing plate 200 may serve to reinforce the side surface of the core portion 100, and the side reinforcing plate 200 is joined to the first upper reinforcing plate 500 to prevent the top plate formed by joining the first upper reinforcing plate 500 to the second upper reinforcing plate 600 from being deformed. In addition, the lower reinforcing plate 400 joined to the lower side of the core portion 100 in the height direction may be further provided, the side reinforcing plates 200 may be joined to both sides of the core portion 100 in the longitudinal direction, the lower reinforcing plate 400 may be joined to the lower surface of the core portion 100, and the side reinforcing plates 200 and the lower reinforcing plate 400 may be joined to each other.

Thus, the core portion 100 is assembled to be inserted from above so that the core portion 100 is received in the inner space of the housing 700 in a state in which the reinforcing plates are joined to surround the upper, lower, left and right surfaces of the core portion, and then the top plate may be fastened with the housing 700 so that the opened upper side of the housing 700 is sealed. At this time, an air inlet 710 through which air is introduced is formed at one side of the housing 700 and an air outlet 720 through which air is discharged is formed at the other side thereof, such that the air introduced into the housing 700 exchanges heat with cooling water passing through the inside of the core portion 100 while passing between the tubes 130 and the fins 140 of the core portion 100 to be cooled and then may be discharged to the outside of the housing 700.

Third Exemplary Embodiment

FIGS. 24 to 27 are an assembled perspective view, exploded perspective views and a front cross-sectional view illustrating a heat exchanger according to a third exemplary embodiment of the present invention.

As illustrated, in a heat exchanger 1000 according to a third exemplary embodiment of the present invention which is formed by stacking and joining a plurality of tubes 130 having a refrigerant channel C, in which a heat exchange medium flows, formed therein, by joining a first plate 130a to a second plate 130b, the first plate 130a and the second plate 130b are provided with a first vertical portion 132 extending from a first horizontal portion at an outside where the first plate 130a and the second plate 130b are joined to each other to form a first joint portion 201 and a second horizontal portion 133 extending from the first vertical portion to form a heat exchange medium channel, such that the second horizontal portion 133 of the first plate 130a and the second horizontal portion 133 of the second plate 130b, which face each other, of the adjacent tubes 130 may be joined to each other to form a second joint portion 202.

First, the heat exchanger according to the third exemplary embodiment of the present invention, the plurality of tubes 130 are arranged to be stacked in the height direction and the fins 140 are interposed between the tubes 130 to join the tubes 130 to the fins 140, such that the core portion 100 may be formed. The tube 130 configuring the core portion 100 may be formed by joining the first plate 130a to the second plate 130b. At this time, in the tube 130, the outsides of the first plate 130a and the second plate 130b are each provided with the first horizontal portion 131 in the horizontal direction that is a flat surface in the longitudinal direction and the width direction and thus the first horizontal portions 131 of the first plate 130a and the second plate 130b are stacked to contact each other and then are joined to each other by the brazing or the like to form the first joint portion 201. Thus, the outside may be sealed by joining the first plate 130a to the second plate 130b and the refrigerant passage C through which a refrigerant which is a heat exchange medium or cooling water may flow may be formed inside the joined portion 201. In addition, the first plate 130a and the second plate 130b may each be formed so that a flow control bead 137 and a protruding bead 138 protrude from the surface of the plate 135 toward the side where the refrigerant channel C is formed, and the flow control bead 137 may be formed long in the form in which the refrigerant passage C may be partitioned to guide the flow of the refrigerant or the flowing direction of the refrigerant may be controlled and the protruding bead 130 may be formed in a cylindrical form or the like to increase the heat exchange area with the refrigerant. Further, the first plate 130a and the second plate 130b are formed in such a manner that the cup portion 136 protrudes from the surface of the plate 135 in the direction toward the adjacent tube 130 which is opposite to the beads 137 and 138. The protruding end part of the cup portion 136 may be provided with a communication hole passing through the upper and lower parts of the cup portion 136 and the cup portions 136 of the adjacent tubes 130 may be easily joined to each other by allowing a part of the protruding end part to be horizontally formed inwardly. Accordingly, the spaces formed by the cup portions 136 of the tubes 130 may be connected to each other and thus may be formed as the inlet tank portion 110 and the outlet tank portion 120, respectively. Thus, as illustrated as an example, if both of the inlet tank portion 110 and the outlet tank portion 120 are formed at one side in the longitudinal direction, the refrigerant introduced into the inlet tank portion 110 through the inlet pipe 111 is distributed to and introduced into each tube 130 and then flows in the longitudinal direction along the refrigerant channel C of one side in the width direction formed in the respective tubes 130 by the flow control bead 137 and then is a U-turned, such that the refrigerant may flow in the longitudinal direction along the refrigerant channel C formed on the other side in the width direction to be collected to the outlet tank portion 120 and then discharged through the outlet pipe 121.

The tube 130 may be provided with the first horizontal portions 131 of the first plate 130a provided with the first joint portion 201 and the first vertical portions 132 extending toward opposite sides, which face each other, from an outside end part of the first horizontal portion 131 of the second plate 130b. The second horizontal portions 133 may extend toward an outside direction from the end part of the first vertical portions 132. That is, the first vertical portion 132 may extend upwardly from the end part of the first horizontal portion 131 of the first plate 130a on which the first joint portion 201 is formed, the second horizontal portion 133 may extend outward from the end part of the first vertical portion 132, the first vertical portion 132 may extend downwardly from the end part of the first horizontal portion 131 of the second plate 130b on which the first joint portion 201 is formed, and the second horizontal portion 133 may extend outward from the end part of the first vertical portion 132 to the outside. Thus, the adjacent tubes 130 are joined to each other by being bonded to each other, and the second horizontal portion 133 of one tube 130 and the second horizontal portion 133 of the other tube 130 are joined to each other so that the second joint portion 202 may be formed.

Accordingly, the second joint portion 202 is further formed on the outer side of the first joint portion 201 which is a portion where the tubes 130 are joined to each other, such that the end parts of the first vertical portions 132 of one tube 130 and the end parts of the first vertical portions 132 of the other tube 130 are all joined to each other by the first joint portion 201 and the second joint portion 202. Therefore, the first vertical portions 132 of the tubes 130 are all joined to each other in the height direction as a whole to be formed in the joined form. Therefore, the strength of the side surface of the core portion 100 can be increased by the first vertical portions 132, the second horizontal portions 133, and the second joint part 202 serving as the reinforcing member, and the reinforcing member may be integrally in the first plate 130a and the second plate 130b for reinforcing the strength, such that the formation of the tube, the formation of the heat exchanger core, the reinforcement of strength may be made by the stacking and joint of the plates, thereby reducing the number of parts to be assembled and improving the assembling performance.

In this case, the first plate 130a and the second plate 130b may be formed in the same shape and the first plate 130a may be turned upside down to form the second plate 130b. Although not shown, the first plate 130a and the second plate 130b may have different shapes. The cooling water introduced from the outside through the inlet pipe 111 may be stored in the inlet tank portion 110 of the core portion 100, and the cooling water passes through the refrigerant channel C of the tubes 130 while flowing downwardly in the height direction along the inside of the inlet tank portion 110 and then is collected in the outlet tank portion 120 to flow upwardly in the height direction along the outlet tank portion 120 and be discharged to the outside through the outlet pipe 121. The fins 140 may be interposed between the tubes 130 to increase heat exchange efficiency. For example, the fins 140 may be formed in a corrugated shape to be joined to the tubes 130 by the brazing or the like. In addition, air may flow to pass through the core portion in the width direction of the core portion 100, and air may be configured to be cooled by exchanging heat while passing between the tubes 130.

In addition, a lower reinforcing plate 400 joined to the lower side of the core portion 100 in the height direction; and a first upper reinforcing plate 500 joined to the upper side of the core portion 100 in the height direction may be further provided. That is, as illustrated, the first plate 130a may be disposed on the lower side of the core portion 100 and the lower reinforcing plate 400 may be coupled to the lower side thereof to form the refrigerant channel C, and the second plate 130b may be disposed on the upper side of the core portion 100 and the first upper reinforcing plate 500 may be coupled to the upper side thereof so that the refrigerant passage C to form the refrigerant channel C. Thus, the strength of the core portion 100 can be further improved by the lower reinforcing plate 400 and the first upper reinforcing plate 500, such that the core portion may be prevented from being deformed even if the high-temperature and high-pressure air passes between the tubes, thereby improving the durability of the core portion. The first upper reinforcing plate 500 may be formed to be wider than the upper surface of the core portion 100, and a circumferential part of the first upper reinforcing plate 500 is provided with fastening holes penetrating through the upper and lower portions thereof, and thus the core portion 100 is inserted into the housing 700 formed to pass air therethrough and then the first upper reinforcing plate 500 may be joined to the housing 700 by the fastening means.

Further, an inlet pipe 111 connected to the inlet tank portion 110 of the core portion 100 and an outlet pipe 121 connected to the outlet tank portion 120 are further provided, and the inlet pipe 111 and the outlet pipe 121 may be fixed by being connected the holes formed on the first upper reinforcing plate 500 and joined to the first upper reinforcing plate 500. That is, the inlet pipe 111 may be connected to the inlet tank portion 110 of the core portion 100, and the outlet pipe 121 may be connected to the outlet tank portion 120 of the core portion 100. At this time, the inlet pipe 111 and the outlet pipe 121 may be joined to each other to penetrate through a coupling hole 510 formed to penetrate through the first upper reinforcing plate 500, and the inlet pipe 111 and the outlet pipe 121 may be fixedly joined to the first upper reinforcing plate 500 by brazing, welding or the like.

In addition, the second joint portion 202 may be formed on one side or both sides of the tubes 130 in the longitudinal direction.

That is, since the air passes through the core portion 100 in the width direction, the second joint portion 202 may be formed on one side or both sides of the tubes in the longitudinal direction which are the position where the flowing of air is not disturbed, such that the second joint portion 202 may be formed on one side surface or both side surfaces of the core portion 100 in the longitudinal direction. More specifically, the first horizontal portion 131, the first vertical portion 132, and the second horizontal portion 133 are each formed on one side or both sides of the first plate 130a and the second plate 130b in the longitudinal direction, and the second horizontal portions 133 may be joined to each other to form the second joint portion 202.

In addition, the second joint portion 202 may extend to surround a part of the side surface in the width direction from the side surface of the tubes 130 in the longitudinal direction.

That is, the first horizontal portion 131, the first vertical portion 132, and the second horizontal portion 132 are each formed on one side or both sides of the first plate 130a and the second plate 130b configuring the tubes 130 in the longitudinal direction, and the first horizontal portion 131, the first vertical portion 132, and the second horizontal portion 133 may each extend from one side or both sides in the longitudinal direction to one side or both sides in the width direction. Thus, the second joint portion 202 may be formed on a part of the side surface of the core portion 100 in the width direction so as to be connected to the side surface of the core portion 100 in the longitudinal direction, thereby further improving the strength of the core portion.

In addition, the inlet tank portion 110 and the outlet tank portion 120 formed by joining the cup portions 136 formed on the first plate 130a and the second plate 130b may be formed on one side or both sides of the tubes 130 in the longitudinal direction.

In other words, as illustrated, the cup portion 136 may be formed only on one side of the first plate 130a and the second plate 130b in the longitudinal direction to form a set of the inlet tank portion 110 and the outlet tank portion 120 on one side of the core portion 100 in the longitudinal direction, the cup portion 136 may be formed on both sides of the first plate 130a and the second plate 130b in the longitudinal direction to form one of two sets of the inlet tank portion 110 and the outlet tank portion 120 on one side of the core portion in the longitudinal direction and the other thereof on the other side of the core portion in the longitudinal direction.

The first vertical portion 132 and the second horizontal portion 133 of the first plate 130a and the second plate 130b may be formed to block at least any one of the air inflow side and the air discharge side of the core portion 100 corresponding to the bypass area b where the inlet tank portion 110 and the outlet tank portion 120 are formed and may be formed to block only a part in the longitudinal direction of the area where the tank portions 110 and 120 are formed.

Figure 30:
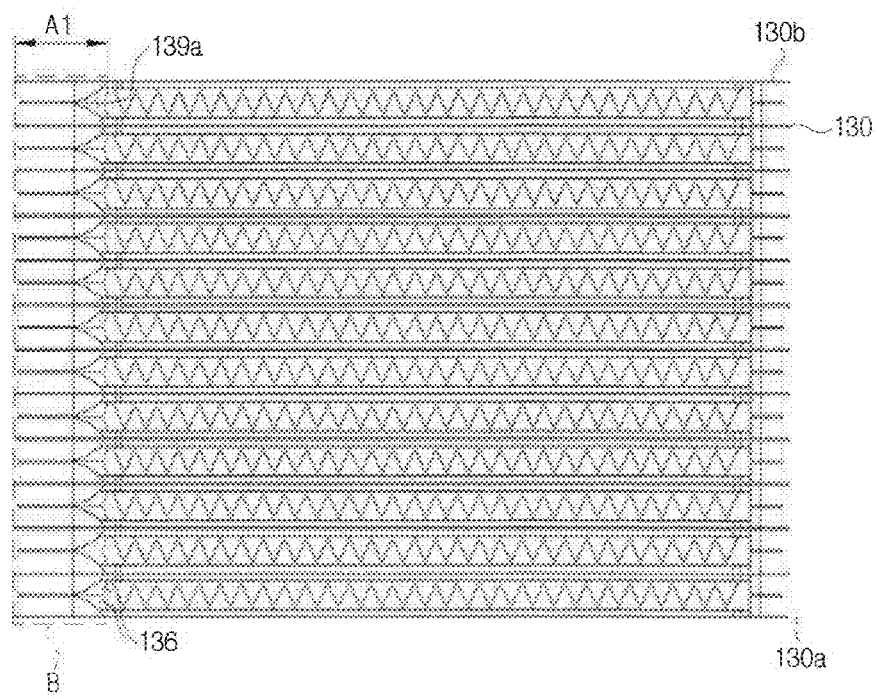
FIG. 30 is a partial front view illustrating a bypass area and an opening portion of a core portion according to the present invention.

That is, as illustrated in FIG. 30, since a part where the inlet tank portion 110 and the outlet tank portion 120 are formed from one side of the core portion 100 in the longitudinal direction is the bypass area B which is a part through which air does not pass in the width direction of the core portion or a part where the heat exchange does not take place smoothly even if air passes through the part, the first vertical portion 132 and the second horizontal portion 133 may be formed to block a part in the longitudinal direction of the bypass area B where the inlet tank portion 110 and the outlet tank portion 120 are formed. Thus, the strength of the core portion is reinforced and the flowing of air is not disturbed, such that it is possible to reduce the pressure drop of air passing through the core portion while improving the heat exchange efficiency. At this time, the first vertical portion 132 and the second horizontal portion 133 formed to block a part of the bypass area B of the core portion 100 may be formed on any one or both of the air inflow side and the air discharge side of the core portion 100. At this time, as illustrated, if the end parts of the first vertical portion 132 and the second horizontal portion 133 formed on the side in the width direction are viewed when the core portion 100 is viewed from the front in the width direction, the first vertical portion 132 and the second horizontal portion 133 may be formed to be inclined in the form in which they are vertically spaced apart from each other toward the longitudinal central side of the core portion based on the second joint portion 202 to block only a part of the bypass area B by the opening portion 139a which is a space therebetween. Thus, as illustrated, when viewed from the front, the first vertical portion 132 and the second horizontal portion 133 may be formed to expose a part of the cup portion 136 forming the tank portions 110 and 120. The length of the area blocked by the first vertical portion 132 and the second horizontal portion 133 is formed to be shorter than a length A1 of the bypass area, and thus the first vertical portion 132 and the second horizontal portion 133 may be formed to block only a part of the bypass area B.

In addition, the first plate 130a and the second plate 130b may be provided with a cut-away portion 139b in a form where the end parts of the first vertical portion 132 and the second horizontal portion 133 on the side surface of the tubes 130 in the width direction are partially cut to be removed.

Figure 31:
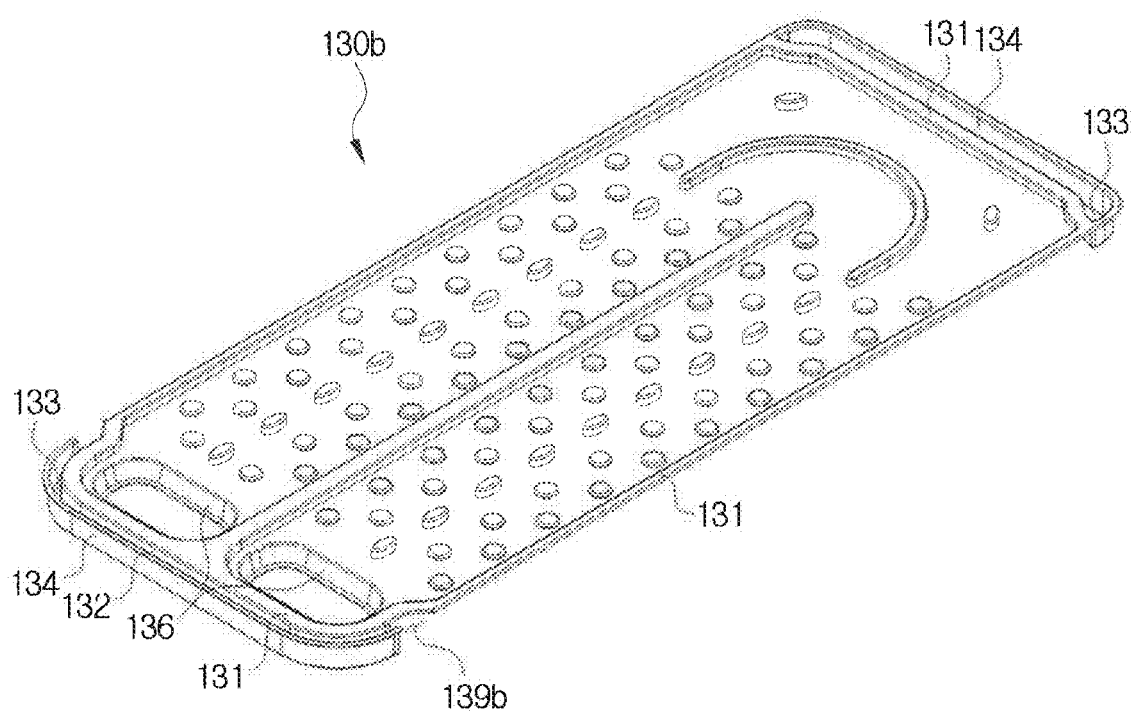
FIG. 31 is a perspective view illustrating another example of a second plate configuring the tube according to the third exemplary embodiment of the present invention.
Figure 32:
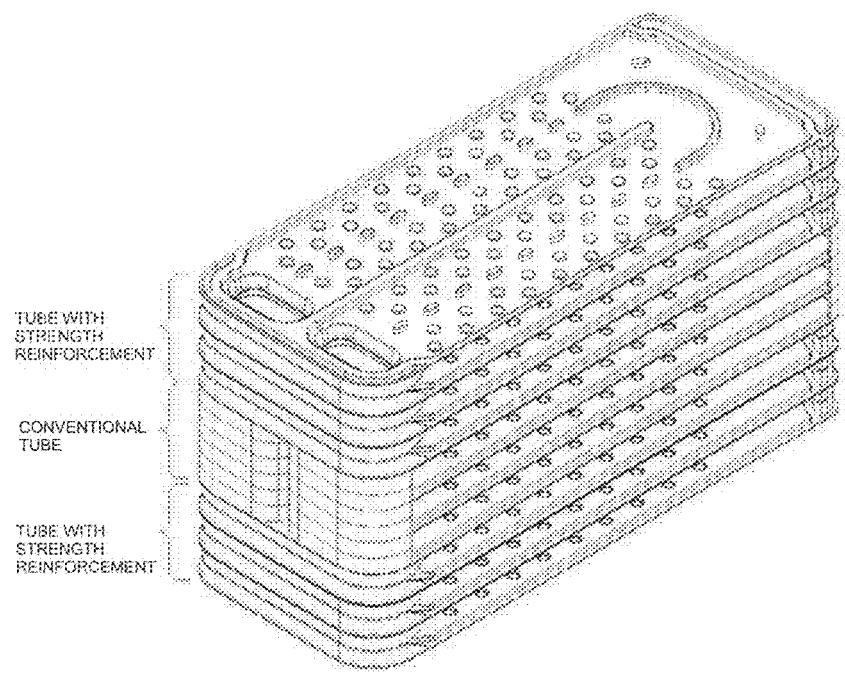
FIGS. 32 to 35 are perspective views and front views illustrating a structure of a core portion in which tubes with strength reinforcement according to the third exemplary embodiment of the present invention and the conventional general tubes are stacked by being combined with each other, except for fins.
Figure 33:
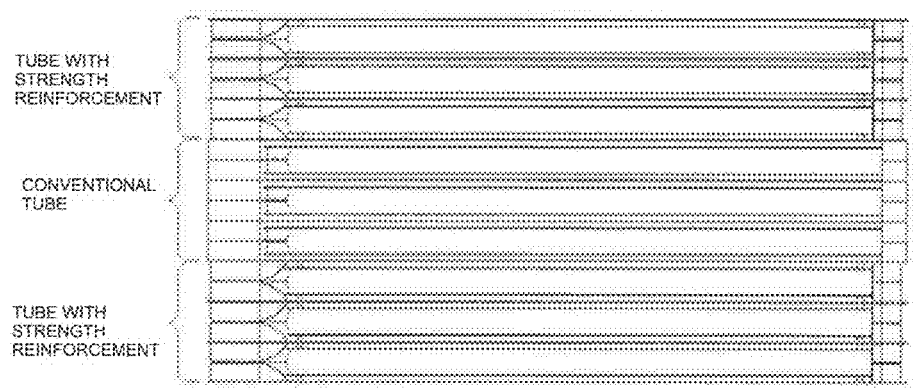
Figure 34:
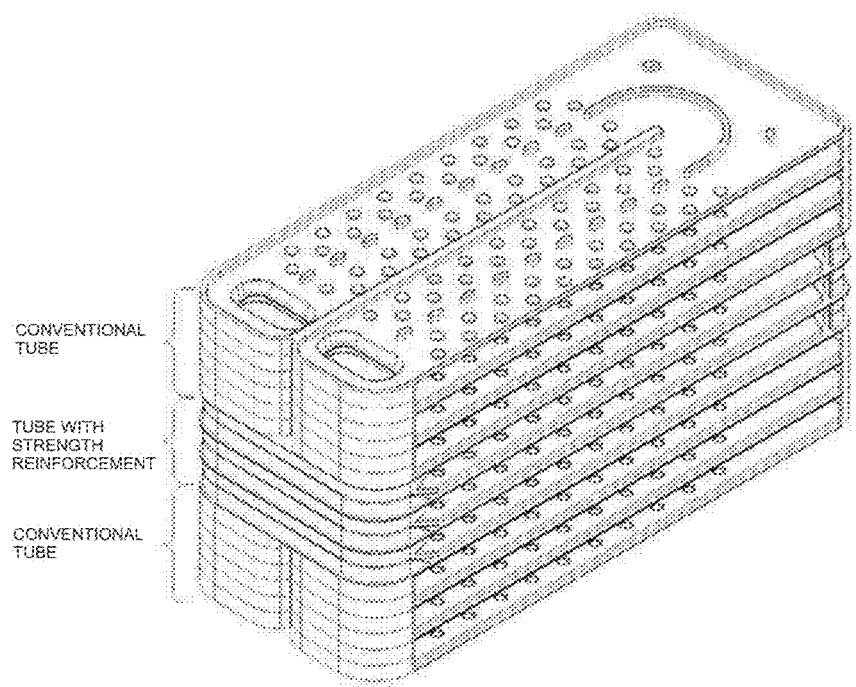
Figure 35:
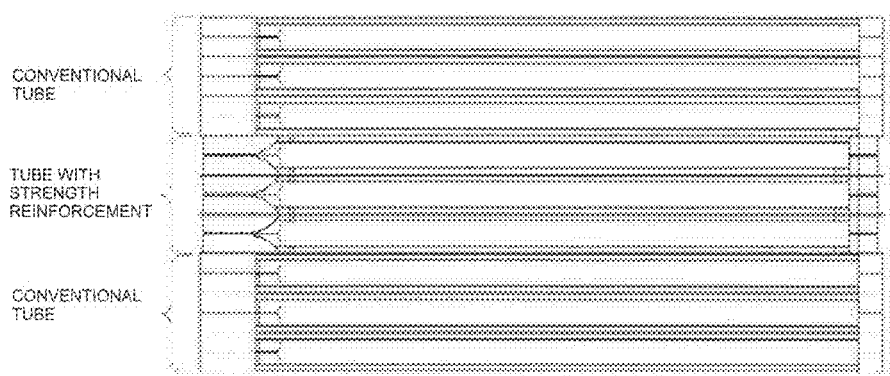

That is, if the end parts of the first vertical portion 132 and the second horizontal portion 133 formed on the side surface in the width direction are formed to meet the first horizontal portion 131 formed on the side surface in the width direction when the second plate 130b is viewed from the top, many curved lines are met with each other at the met parts and therefore it is difficult in design and manufacturing. As a result, as illustrated in FIG. 31, the cut-away portion 139b is formed in the form where the met parts are removed, such that the end parts of the first vertical portion 132 and the second horizontal portion 133 may be easily formed in a linear form.

In addition, the first plate 130a and the second plate 130b may be provided with the second vertical portion 134 extending from the second horizontal portion 133.

That is, as illustrated, the second vertical portion 134 extends in the height direction from the outside end part of the second horizontal portion 133, thereby further improving the strength of the core portion. At this time, the second vertical portions 134 in one tube 130 may extend from the end part of the second horizontal portion 133 to be toward the opposite direction. As illustrated, the third horizontal portion horizontally extends outwardly from the end parts of the second vertical portions 134 and the third horizontal portions are joined to each other, thereby further improving the strength.

In addition, referring to FIGS. 32 to 35, the tubes 130 with strength reinforcement according to the third exemplary embodiment of the present invention by joining the second horizontal portions 133 to each other to form the second joint portion 202 are stacked together with the conventional generally used tubes without strength reinforcement, thereby partially reinforcing the strength of the core. In this case, the core may be configured by disposing the tubes with strength reinforcement according to the third exemplary embodiment of the present invention at the upper and lower sides thereof and the conventional tubes without strength reinforcement at the center thereof. On the contrary, the core may be configured by disposing the tubes without strength reinforcement at the upper and lower sides thereof and the tubes with strength reinforcement according to the third exemplary embodiment of the present invention at the center thereof. In addition, the core may be configured in various forms.

The heat exchanger of the present invention can minimize the reduction in the cooling performance and reduce the pressure loss of air as the cooling fluid by opening portion of the bypass area at the part where the inlet/outlet header tanks are located in the heat exchanger core portion.

In addition, according to the heat exchanger of the present invention, the structural rigidity of the top plate joined to block the opening portion of the housing can be increased to prevent the top plate from being deformed due to the pressure of air flowing inside the housing, thereby preventing air from being leaked to the outside of the housing.

Further, according to the heat exchanger of the present invention, the formation and strength reinforcement of the core portion can be made together by joining the plates integrally formed with the reinforcing material, such that the number of parts to be assembled can be reduced and the assembling performance can be improved.

The present invention is not limited to the above-mentioned exemplary embodiments but may be variously applied, and may be variously modified by those skilled in the art to which the present invention pertains without departing from the gist of the present invention claimed in the claims.

What is claimed is:
1. A heat exchanger, comprising:
   a core portion configured to include an inlet header tank and an outlet header tank having a space, in which cooling water is stored and flows, formed therein and formed in a height direction, a plurality of tubes having both ends connected to the header tanks to form a cooling water channel, and fins interposed between the tubes, wherein the core portion has a width direction, a height direction and a length direction and has a side in the width direction, at least two sides in the length direction and two sides in the height direction;
   a side reinforcing plate having ends at the width direction and disposed on at least one of both sides of the length direction side surfaces of the core portion and joined to the tubes, and wherein the side reinforcing plate is formed along the height direction and along the width direction; and a pair of blocking plates extend in from the side reinforcing plate in the length direction to block an air inflow side of the core portion corresponding to a bypass area where the header tanks are formed, wherein the pair of blocking plates are formed to block only a portion of an area where the header tanks are formed in the length direction, wherein the bypass area is an area corresponding to a length from one end in the length direction of the core portion comprising the header tanks to a portion where the header tanks are longitudinally formed; and the blocking plates are formed to block only a part in the length direction of each of the bypass area, wherein the inlet header tank and the outlet header tank are disposed on one side of the core portion in the length direction.

2. The heat exchanger of claim 1, wherein the inlet header tank and the outlet header tank are disposed at a same position as one another in the length direction.

3. The heat exchanger of claim 2, wherein a blocking area ratio is a ratio of an area blocked by the blocking plate in the bypass area with respect to the entire bypass area.

4. The heat exchanger of claim 1, wherein the blocking plate is joined to the core portion.

5. The heat exchanger of claim 1, wherein the blocking plate has an opening portion formed at an end part thereof in the length direction.

6. The heat exchanger of claim 5, wherein the opening portion is formed between the tubes of the core portion in the height direction.

* * * * *